United States Patent
Hong et al.

(10) Patent No.: US 11,954,610 B2
(45) Date of Patent: Apr. 9, 2024

(54) ACTIVE SURVEILLANCE AND LEARNING FOR MACHINE LEARNING MODEL AUTHORING AND DEPLOYMENT

(71) Applicant: GE Precision Healthcare LLC, Milwaukee, WI (US)

(72) Inventors: Junpyo Hong, San Ramon, CA (US); Venkata Ratnam Saripalli, Danville, CA (US); Gopal B. Avinash, San Ramon, CA (US); Karley Marty Yoder, Oakland, CA (US); Keith Bigelow, Berkeley, CA (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 917 days.

(21) Appl. No.: 16/944,762

(22) Filed: Jul. 31, 2020

(65) Prior Publication Data
US 2021/0042643 A1 Feb. 11, 2021

Related U.S. Application Data

(60) Provisional application No. 62/885,182, filed on Aug. 9, 2019.

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| 10,719,301 B1* | 7/2020 | Dasgupta ............. G06V 10/774 |
| 10,902,043 B2* | 1/2021 | Cremer .................. G06N 3/045 |
| 2017/0193362 A1 | 7/2017 | Cremer et al. |

FOREIGN PATENT DOCUMENTS

| CN | 107077463 A | 8/2017 |
| CN | 108665462 A | 10/2018 |

OTHER PUBLICATIONS

Bonechi, Simone, et al. "Confidence measures for deep learning in domain adaptation." Applied Sciences 9.11 (2019): 2192. (Year: 2019).*

(Continued)

*Primary Examiner* — Eric Nilsson
(74) *Attorney, Agent, or Firm* — Amin, Turocy & Watson, LLP

(57) ABSTRACT

Techniques are described for performing active surveillance and learning for machine learning (ML) model authoring and deployment workflows. In an embodiment, a method comprises applying, by a system comprising a processor, a primary ML model trained on a training dataset to data samples excluded from the training dataset to generate inferences based on the data samples. The method further comprises employing, by the system, one or more active surveillance techniques to regulate performance of the primary ML model in association with the applying, wherein the one or more active surveillance techniques comprise at least one of, performing a model scope evaluation of the primary ML model relative to the data samples or using a domain adapted version of the primary ML model to generate the inferences.

27 Claims, 18 Drawing Sheets

(56) References Cited

OTHER PUBLICATIONS

Tzeng, et al., "Adversarial discriminative domain adaptation," In Proceedings of the IEEE Conference on Computer Vision and Pattern Recognition, arXiv:1702.05464v1 [cs.CV] Feb. 17, 2017, (pp. 7167-7176).

Sun, et al., "Deep coral: Correlation alignment for deep domain adaptation," In European Conference on Computer Vision, rXiv: 1607.01719v1 [cs.CV] Jul. 6, 2016, (pp. 443-450). Springer, Cham.

Venkataramani, et al., "Towards Continuous Domain Adaptation For Medical Imaging," In 2019 IEEE 16th International Symposium on Biomedical Imaging (ISBI 2019), arXiv: 1812.01281v1 [cs.CV] Dec. 4, 2018, (pp. 443-446). IEEE.

Extended European Search Report received for European Patent Application Serial No. 20189481.3 dated Feb. 5, 2021, 12 pages.

Quintanilha et al., "Detecting Out-of-Distribution Samples using Low-order Deep Feature Statistics", International Conference on Learning Representations, 2019, 17 pages.

Liang et al., "Enhancing the Reliability of Out-of-distribution Image Detection in Neural Networks", International Conference on Learning Representations, arXiv: 1706.02690v5, 2018, 15 pages.

Liu et al., "Generative Adversarial Active Learning for Unsupervised Outlier Detection", IEEE, Transactions on Knowledge and Data Engineering, arXiv: 1809.10816v4, Mar. 18, 2019, 13 pages.

Communication pursuant to Article 94(3) EPC received for European Patent Application Serial No. 20189481.3 dated Feb. 22, 2023, 9 pages.

First Office Action received for Chinese Patent Application Serial No. 202010797932.9 dated Jan. 10, 2024, 20 pages (Including English Translation).

* cited by examiner

SITE DASHBOARD 300

Data Sample 302

Model Results For the Data Sample 304

1. Scope Score, Outlier/Inlier Classification, etc.

2. Model Output (e.g., a classification for the data sample such as diagnosis, a segmentation mask such as an organ segmentation mask, an image reconstruction, etc., etc.)

Model Results Feedback 306

1. Are the results correct?
   ☐ Yes  ☐ No

2. Rate the accuracy of the results with a 0 being the least accurate and a 10 being the most accurate?

1  2  3  4  5  6  7  8  9  10

3. Are there any errors in the results? If yes, what are the errors?
   ☐ Yes  ☐ No Errors: _____

4. Please provide any additional review feedback?
   _____

Annotation for Image Data Samples 308

Input Image 302'

Output Image 304'

Please mark-up the input image to indicate the correct output and/or the output image to indicate any errors in the output?

ACTIVE SURVEILLANCE AND LEARNING FOR MACHINE LEARNING MODEL AUTHORING AND DEPLOYMENT

RELATED APPLICATION

This application claims priority to U.S. Provisional Application Ser. No. 62/885,182 filed Aug. 9, 2019 and titled "ACTIVE SURVEILLANCE AND LEARNING FOR DEEP NEURAL NETWORK (DNN) MODEL AUTHORING AND DEPLOYMENT," the entirety of which application is incorporated herein by reference.

TECHNICAL FIELD

This application generally relates to artificial intelligence (AI) integration in healthcare workflows, and more particularly to computer-implemented techniques for performing active surveillance and learning for machine learning (ML) model authoring and deployment workflows.

SUMMARY

The following presents a summary to provide a basic understanding of one or more embodiments of the invention. This summary is not intended to identify key or critical elements or to delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products are provided for performing active surveillance and active learning for machine learning (ML) model authoring and deployment workflows. Various embodiments of the disclosed techniques are exemplified with respect to techniques for performing such active surveillance and learning for ML model authoring and deployment workflows in the healthcare domain. However, it should be appreciated that the disclosed techniques are not limited to the healthcare domain and can be applied to other domains that employ ML models in various types of workflows.

In some embodiments, active surveillance techniques are provided that employ one or more active or automated (without manual involvement) elements to facilitate the aggregation of performance and usage measurements of a ML model deployed in the field. In one or more implementations of these embodiments, an active surveillance method is provided that comprises applying, by a system comprising a processor, a primary ML model trained on a training dataset to data samples excluded from the training dataset to generate inferences based on the data samples. The method further comprises employing, by the system, one or more active surveillance techniques to regulate performance of the primary ML model in association with the applying, wherein the one or more active surveillance techniques comprise at least one of, performing a model scope evaluation of the primary ML model relative to the data samples or using a domain adapted version of the primary ML model to generate the inferences.

In some embodiments, the model scope evaluation can be employed to determine whether the data samples are within a scope of the training dataset, and the method can comprises applying, by the system, the primary ML model to a data sample of the data samples based on a first determination that the data sample is within the scope, or applying the domain adapted version of the primary ML model to the data sample based on a second determination that the data sample is not within the scope. In some implementations, the model scope evaluation comprises determining confidence scores for the data samples representative of a degree of confidence in the performance of the primary ML model on the new data samples. With these implementations, the method can comprise using the domain adapted version of the primary ML model for a data sample based on a determination that the degree of confidence is less than a threshold degree of confidence, and using the primary ML model for the data sample based on a determination that the degree of confidence is greater than or equal to the threshold degree of confidence.

In various embodiments, the active surveillance method further comprises presenting, by the system, the inferences and the confidence scores respectively determined for the data samples to one or more entities, and receiving, by the system, feedback from one or more entities regarding accuracy of the inferences. The method can further comprise generating, by the system, performance evaluation information for the primary ML model and the domain adapted version of the primary ML model, the performance evaluation information comprising the confidence scores and the feedback, and sending, by the system, the performance evaluation information to an external system that monitors performance of a plurality of ML models deployed at different sites. Additionally, or alternatively, the system can store the data samples, the inferences respectively determined for the data samples, and the performance evaluation information respectively associated with the data samples, in a database accessible to the external system. With these embodiments, the external system can access the information in the databased and employ the information to evaluate and monitor the performance of the respective models.

In this regard, one or more additional embodiments are directed to directed to vendor platform dashboard that aggregates feedback from different client sites and provides a global monitor of how the models are performing at the different sites. In accordance with theses embodiments, a method can comprise receiving, by a system operatively coupled to a processor, performance metrics for different sets of machine learning models deployed at different sites, wherein the different sets of the machine learning models comprise at least one different version of a same model that has been adapted to a target domain of the different sites. The method further comprises generating, by the system, a surveillance dashboard that presents the performance metrics for the different sites. In some implementations, the performance metrics can be received as they are generated at the different sites over a period of usage of the different sets of the machine learning models, and the method further comprises updating, by the system, the surveillance dashboard over the period of usage.

The method can further comprise monitoring, by the system, performance of respective models included in the different sets based on the performance metrics, and determining, by the system, whether the performance of the respective models drops below a defined performance level. The method can further comprise initiating, by the system, a model updating process for a model of the respective models based on a determination that the performance of the model drops below the defined performance level.

Additional embodiments further provide active learning techniques for model updating that improve the adoption of feedback on at least one deployed primary ML model from at least one site. In one or more implementations of these embodiments, a method can comprise receiving, by a system operatively coupled to a processor, a curated dataset comprising data samples determined to be outside a scope of a primary ML model based on application of a scope model to the data samples, and annotated data regarding accuracy of inference results respectively generated based on application of the primary ML model to the data samples or application of a domain adaption extension of the primary ML model to the data samples. The method can further comprise employing, by the system, the curated dataset to generate an updated version of the primary ML model and at least one of: an updated version of the domain adaptation extension or an updated version of the scope model.

In some embodiments, prior to receiving the curated dataset, the method can comprise receiving, by the system, an intermediate curated dataset comprising the data samples, and presenting, by the system, the intermediate curated dataset to one or more entities via a graphical user interface to facilitate annotating the data samples, resulting in generation of the annotated data. With these embodiments, the data samples and the annotated data can be aggregated to generate the curated dataset.

In some embodiments, the data samples are associated with a target domain, and the primary ML model was trained based on first training data from a source domain. With these embodiments, the domain adaptation extension and the scope model can respectively comprise networks trained based on second training data from the target domain. For example, in one implementation, the domain adaptation extension of the primary ML model comprises one or more components of the primary ML model combined with a domain adaptation component, wherein the domain adaptation component comprises a different feature extraction network relative to the primary ML model that was trained based on second training data from a target domain.

The active learning method can further comprise evaluating, by the system, performance of the updated version of the primary ML model, the updated version of the domain adaptation extension, and the updated version of the scope model based on defined performance criteria, and iteratively updating, by the system, one or more of, the updated version of the primary ML model, the updated version of the domain adaptation extension, or the updated version of the scope model until the defined performance criteria are not met. In some implementations, the data samples are associated with an entity that deploys the primary ML model (e.g., a particular site), and the method further comprises sending, by the system, one or more of, the updated version of the primary ML model, the updated version of the domain adaptation extension, or the updated version of the scope model to the entity based on determination that the defined performance criterial has been met.

The curated dataset can further comprise annotated data respectively associated with the inference results regarding accuracy of the inference results. In some embodiments, the curated dataset (including the annotated data) can be received from the entity that deployed the primary ML model or the domain adapted extension to the data samples to generate the inference results.

Additionally, or alternatively, the active learning method can comprise applying, by the system, the scope model to candidate data samples to determine confidence scores for the candidate data samples that represent a degree of confidence in performance accuracy of the primary ML model on the candidate data samples, wherein the data samples are included in the candidate data samples. The method can further comprise selecting, by the system, the data samples from amongst the candidate data samples based on the data samples having confidence scores below a threshold score, applying, by the system, at least one of the primary ML model or the domain adaption extension of the primary ML model to the data samples to generate the inference results. With these embodiments, the method can further comprises facilitating, by the system, application of the annotated data to the inference results prior to employing the curated data set to generate the updated versions of the primary ML model, the scope model and/or the domain adaptation extension of the primary ML model.

In some embodiments, elements described in connection with the disclosed computer-implemented methods can be embodied in different forms such as a computer system, a computer program product, or another form.

DESCRIPTION OF THE DRAWINGS

FIG. 3 presents an example site dashboard that facilitates evaluating model performance at deployment site in accordance with one or more embodiments of the disclosed subject matter.

DETAILED DESCRIPTION

Figure 1:
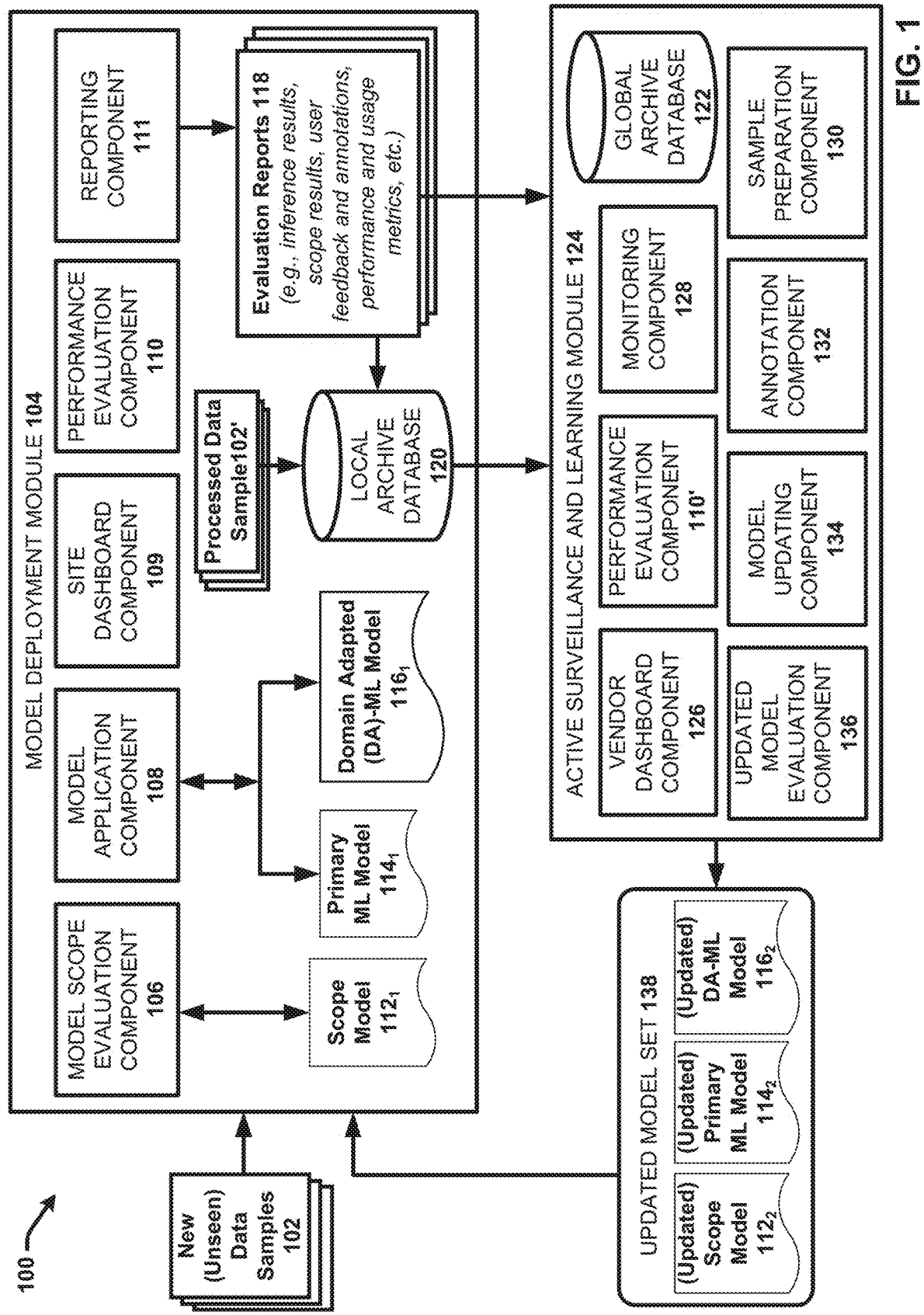
FIG. 1 illustrates a block diagram of an example, non-limiting system that facilitates performing active surveillance and learning for ML model authoring and deployment workflows in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure provides systems, computer-implemented methods, apparatus and/or computer program products that facilitate performing active surveillance and active learning for DNN model authoring and deployment workflows. Artificial intelligence (AI) and machine learning (ML) is a rapidly progressing technical field impacting a wide range of industries. Advancements in machine learning technologies, such as deep neural networks (DNN)s, have recently shown impressive performance, sometimes exceeding humans, in various ML domains, including computer vision, speech, natural language processing (NPL), bioinformatics, drug design, medical image analysis, and more. For example, ML can be used in medical imaging to automatically characterize features in images to make radiologists more efficient, minimize errors, and help them make their reports more quantitative and useful for the patients they serve. These achievements were made possible by significant improvement in computation power as well as the availability of massive scale annotated datasets, leading to better inferencing performance than traditional models.

However, the data-driven nature of ML models leads to challenges during the inferencing stage. In particular, one of the fundamental problems in data-driven based machine learning approaches is that the final model inferencing capability is limited by the scope of the training data used to develop the model. For example, in various domains, AIs models are often trained and developed by a particular model development entity, such as a vendor that develops ML models for usage by multiple client systems. For instance, in the healthcare domain, the vendor often includes a software development system that specializes in developing ML tools for healthcare systems, such as hospitals, medical imaging centers, and the like. In accordance with this example, the healthcare system (e.g., the hospital, the medical imaging center, etc.) corresponds to the client system. The term "vendor", "vendor site", "vendor system" or variants thereof is used to refer to the vendor entity or system that generates, updates and provides a ML model to one or more client systems for deployment. The term "client", "client site", "client system," or variants thereof is generally used herein to refer to the client system that receives and deploys the ML model in the field.

In accordance with the above described vendor-client system architecture for ML model development and deployment, the scope of the vendor created model is limited by the training data used by the vendor. Depending on the nature of the model and the data being processed, it can be very difficult if not impossible for the vendor training data to be comprehensive of all the variations the model will encounter when deployed in the field. For example, a ML model trained on clinical data from one hospital may not perform as well on the same type of data from another hospital. In this regard, the vendor/model developer does not have access to every possible medical image ever taken in the word and new medical images and features will constantly evolve as the patients and acquisition technologies evolve over time. Accordingly, techniques for regularly monitoring the performance of a deployed model at a client site and updating the model to the particular nuances and variations in the data at the client site over time are crucial to the successful integration of ML models for real-world applications.

The disclosed subject matter provides semi-automated mechanisms for monitoring and evaluating the performance of ML models deployed in the field and for updating and tailoring the ML models over time to account for new data types observed in the field. The disclosed techniques are particularly directed to improving the efficiency and accuracy of existing ML model performance monitoring and active learning techniques by integrating one or more active or automated elements (e.g., elements that do not involve manual intervention) into the ML model performance monitoring and/or active learning workflows.

In this regard, existing techniques for ML model performance monitoring and updating are passive processes in the sense that 100% of the monitoring and/or updating is performed by human/manual observation and interaction. These techniques are not only inefficient, but prone to natural human error. In accordance with the disclosed techniques, one or more active ML elements (e.g., ML models/algorithms) are integrated into both the monitoring and the updating processes that facilitate reducing the amount of manual/human involvement relative to the passive monitoring techniques. These one or more active ML elements are in addition to the deployed primary ML model itself. The primary ML model can include various types of ML models (e.g., neural network models, deep learning neural network models, decision tree models, support vector machine (SVM) models, regression analysis models, Bayesian network models, heuristic models, etc.) configured to perform various types of inferencing tasks (e.g., including classification tasks, segmentation tasks, detection tasks, regression tasks, and the like) in various domains.

In some embodiments, the one or more active ML elements can include a model scope evaluation element that employs one or more ML based model scope models to evaluate the scope of a deployed ML model relative to new or unseen data (e.g., data samples excluded from the training dataset used to train the ML model). For example, in some implementations, the one or more model scope models can include a confidence estimation model configured to evaluate a confidence in the ML model to infer on the new/unseen data. With these embodiments, the confidence estimation model can generate a confidence score for an unseen data sample that reflects a degree of confidence in the ML model's performance ability to generate accurate inference results based on the unseen data. In other implementations, the one or more model scope models can include an outlier detection model configured to determine whether an unseen data samples is inside or outside the scope of the deployed ML model. For example, the outlier detection model can include a ML based model configured to evaluate the features of an unseen data sample relative to the features of the training data set used to train the deployed ML model and determine whether the unseen data sample is inside or outside the scope of the training data set.

Additionally, or alternatively, the one or more ML elements used to improve the accuracy and efficiency of the primary ML model deployment monitoring workflows and primary ML model updating workflows can include a domain adaptation element that provides one or more domain adaptation techniques to improve the accuracy of a trained model on data samples from a different domain relative the training data samples. As applied to domain adaptation, the training data set is generally referred to herein as the source domain, while the domain of the unseen data samples at a model deployment site (e.g., the client site) is referred to the target domain. In this regard, domain adaptation refers to techniques for maintaining or improving the accuracy of a ML model for data samples of a target domain, wherein the ML model was trained on data samples from a source domain.

In some embodiments, the domain adaptation element can be or include a domain adapted version of the primary ML that employs a different feature extractor network relative to the primary ML model yet employs other original network elements (e.g., DNN layers) of the primary ML model. With these embodiments, a domain adapted feature extractor network can be developed that is tailored to the target domain using adversarial training on data samples from the target domain. The resulting feature extractor can thus be tailored to extract at least some features exclusively included in the target domain as opposed to the source domain.

As described in greater detail infra, one or both of the above described ML elements (e.g., model scoping and/or domain adaptation) can be integrated into both the monitoring workflows and the updating workflows. In this regard, the disclosed subject matter involves two parts, an active surveillance part and an active learning part.

The active surveillance part is directed to techniques for performing active surveillance in ML model deployment workflows (e.g., at a client site). At a high level, the disclosed active surveillance techniques involves monitoring and evaluating the performance of a deployed primary ML model at a client site using one or more of the active elements described above (e.g., the model scope evaluation and/or the domain adaptation), and generating and archiving performance evaluation and usage measurements for the deployed primary ML model at the client site.

In one or more embodiments, an active surveillance method can include accessing or receiving new/unseen data samples at a deployment site of a primary ML model for processing by the primary ML model. Using one or more confidence evaluation models, the respective new data samples can be evaluated to determine a confidence score of the primary ML model to infer on the respective data samples. In some embodiments, the active surveillance method can further include applying a domain adapted version of the primary ML model instead of the original ML model to generate inferences based on the respective data samples. The domain adapted version of the primary ML model can be configured to adaptively adjust to the unseen data that comes in. For example, the domain adapted version of the primary ML model can be previously generated (e.g., by the vendor site) based on a set of training data samples that are from the same target domain as the new/unseen data samples (e.g., from the client site), and/or that are known to have a defined degree of similarity to the new/unseen data samples. In other embodiments, the method can involve applying the domain adapted version to only those data samples that receive a low confidence score (or otherwise determined to be outlier data samples). With these embodiments, the system can apply the primary ML model to the incoming data samples that are associated with high confidence scores (or otherwise determined to be inlier data samples) and the domain adapted version of the primary ML model to data samples that are associated with low confidence scores.

In some embodiments, the active surveillance techniques can further involve presenting the inferred outputs along with the evaluated confidence scores for the respective data samples to one or more entities (e.g., users, system administrators, domain experts, etc.) to provide feedback regarding the performance accuracy of the model. The method can further involve storing the processed data samples along with the received user feedback, the primary ML outputs and the evaluated confidence scores for the respective data samples in an archive database. This stored data can be subsequently employed in the active learning process.

The active learning part of the disclosed subject matter is directed to techniques for performing active learning for ML model updating and authoring workflows (e.g., at a vendor site). In various embodiments, the active learning process can involve not only updating the primary ML model to perform better (e.g., in terms of accuracy and/or specificity) for a particular target domain (e.g., of a client site where the ML model is deployed), but also updating one or more of the active surveillance elements (e.g., the model scope evaluation model and/or the domain adapted primary ML model) used in conjunction with the primary ML model at the client site. The disclosed subject matter further describes novel workflows that tie both the active surveillance and the active learning pieces together in a continuous loop, wherein the active learning process uses the output of the active surveillance process to facilitate not only updating the primary ML model itself, by the additional active elements of the active surveillance processes. The regularly updated primary ML model and updated active ML elements can further be re-integrated into the active surveillance process at the client site.

Various embodiments of the disclosed subject matter are exemplified with respect techniques for performing active surveillance and active learning for ML model authoring and deployment workflows in the healthcare domain. However, it should be appreciated that the disclosed techniques are not limited to the healthcare domain and can be applied to other domains that employ AI/ML models in various types of workflows. For example, the disclosed techniques can be employed to actively monitor the performance of deployed AI/ML models used in domains, including computer vision, speech, natural language processing (NPL), bioinformatics, drug design, medical image analysis, and more. The disclosed techniques can also be employed to facilitate actively updating the deployed ML models based using the disclosed active learning techniques.

The term "image processing model" is used herein to refer to an AI/ML model configured to perform an image processing or analysis task on images. The image processing or analysis task can vary. In various embodiments, the image processing or analysis task can include, (but is not limited to): a segmentation task, an image reconstruction task, an object recognition task, a motion detection task, a video tracking task, an optical flow task, and the like. The image processing models described herein can include two-dimensional image processing models (2D) as well as three-dimensional (3D) image processing models. The image processing model can employ various types of AI/ML algorithms, including (but not limited to): deep learning models, neural network models, deep neural network models (DNNs), convolutional neural network models (CNNs), and the like.

The term "image-based inference output" is used herein to refer to the determination or prediction that an image processing model is configured to generate. For example, the image-based inference output can include a segmentation mask, a reconstructed image, an adapted image, an annotated image, a classification, a value, or the like. The image-based inference output can vary based on the type of the model and the particular task that the model is configured to perform. The image-based inference output can include a data object that can be rendered (e.g., a visual data object), stored, used as input for another processing task, or the like. The terms "image-based inference output", "inference output" "inference result" "inference", "output", "predication", and the like, are used herein interchangeably unless context warrants particular distinction amongst the terms.

As used herein, a "medical imaging processing model" refers to an image processing model that is tailored to perform an image processing/analysis task on one or more medical images. For example, the medical imaging processing/analysis task can include (but is not limited to): organ segmentation, anomaly detection, anatomical feature characterization, medical image reconstruction, diagnosis, and the like. The types of medical images processed/analyzed by the medical image processing model can include images captured using various types of imaging modalities. For example, the medical images can include (but are not limited to): radiation therapy (RT) images, X-ray images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. The medical images can include two-dimensional (2D) images as well as three-dimensional images (3D).

The terms "source domain model", "source model" "source image processing model", "source domain image processing model" and the like are used herein interchangeably to refer to an imaging processing model trained on images from specific domain, referred to herein as the source domain Images included in the source domain are referred to herein as "source domain images" or "source images." The terms "target domain model", "target model", "target image processing model", "target domain image processing model", and the like, are used herein interchangeably to refer to an imaging processing model configured to perform a same or similar image processing task as a corresponding source domain model, yet on images from a different but similar domain, referred to herein as the "target domain" Images included in the target domain are referred to herein as "target domain images" or "target images".

In this regard, source domain (SD) images and target domain (TD) images can include similar images that have some consistent variations. These consistent variations can be based on different capture modalities, acquisition protocols, demography, and other factors affecting image quality (IQ) or appearance. In some implementations, the SD image and the TD images comprise images captured of the same object that differ with respect to at least one visual appearance property. In other implementations, the SD image and the TD images comprise medical images of a same anatomical body part (e.g., a same organ), yet differ with respect to capture modality. For example, with respect to radiation therapy (RT) images (e.g., CT scans, MRI scans, etc.), the SD images and the TD images can vary with respect to having or not having contrast injection. The RT images can also vary with respect to different capture voltages. For example, RT images can be captured at varying kilovoltages for different applications, ranging from 70 kilovolts (kVs) to about 140 kVs, which can cause variances in the resulting image quality. In another example, the SD and TD images can include MRI images that vary with respect to sequence intensities.

The term "optimized image-based inference output" is used herein to refer to an image-based inference output that has been adapted or adjusted for a target domain image. In various embodiments, an "optimized image-based inference output" refers to a SD model inference output generated based on a target domain image that has been corrected or adjusted to account for errors attributed to domain variations. The terms "optimized image-based inference output", "optimized inference output" "optimized inference result" "optimized inference", "optimized output", "optimized predication", and the like, are used herein interchangeably unless context warrants particular distinction amongst the terms.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates performing active surveillance and learning for ML model authoring and deployment workflows in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, system 100 includes a model deployment module 104 and an active surveillance and learning module 124 which can respectively be and include computer executable components. The computer executable components associated with the model deployment module 104 can include model scope evaluation component 106, model application component 108, site dashboard component 109, performance evaluation component 110 and reporting component 111. The model deployment module 104 can also include (and/or be operatively coupled thereto), a scope model (SM) $112_1$, (hereinafter scope model $112_1$), a primary ML model $114_1$, a domain adaptation (DA) ML model $116_1$ (hereinafter DA-ML model $116_1$), and a local archive database 120. The computer executable components associated with the active surveillance and learning module 124 can include, vendor dashboard component 126, performance evaluation component 110', monitoring component 128, sample preparation component 130, annotation component 132, model updating component 134, and updated model evaluation component 136. The active surveillance and learning module 124 can also include (and/or be operatively coupled thereto) a global archive database 122.

The model deployment module 104 and the components/models associated therewith (e.g., the model scope evaluation component 106, the model application component 108, the site dashboard component 109, the performance evaluation component 110, the reporting component 111, the scope model $112_1$, the primary ML model $114_1$, and the DA-ML model $116_1$), as well as the active surveillance and learning module 124 and the components respectively associated therewith (e.g., the vendor dashboard component 126, the, performance evaluation component 110', the monitoring component 128, the sample preparation component 130, the annotation component 132, the model updating component 134, and the updated model evaluation component 136), can respectively be or include machine-executable components stored in memory (not shown) associated with the one or more machines (not shown). The memory can further be operatively coupled to at least one processor (not shown), such that the components (e.g., the model deployment module 104 and the components/models associated therewith, and the active surveillance and learning module 124 and the components respectively associated therewith), can be executed by the at least one processor to perform the operations described. Examples of said and memory and processor as well as other suitable computer or computing-based elements, can be found with reference to FIG. 17, and can be used in connection with implementing one or more of the systems or components shown and described in connection with FIG. 1 or other figures disclosed herein.

In various embodiments, the model deployment module 104 can be or correspond to a system that executes a task specific ML in a deployment scenario (as opposed to a training and development scenario). For example, in some example implementations, the task specific ML model can comprise a medical imaging processing model configured to process medical images and perform a diagnosis task, an image reconstruction task, an organ segmentation task or the like. In accordance with this example, the model deployment module 104 can be employed by a hospital system or the like to facilitate radiology workflows and related applications. However, it should be appreciated that the type of the ML model and deployment use case can vary and is not limited to the medical field. In some embodiments, the model deployment module 104 can further provide the model results to an end user (e.g., a clinician/radiologist in the medical imaging example) using a suitable rendering mechanism (e.g., a graphical user interface for rendering on a device display, or the like) and/or another computing system/device for additional processing.

In addition to merely applying the task specific ML and providing the results, the model deployment module 104 can further facilitate performing active surveillance in ML model deployment workflows. In this regard, the model deployment module 104 can provide active surveillance techniques at the deployment site (also referred to herein as the client site) that facilitate generating model performance metrics (at the deployment site) regarding how well the ML model is performing on the data samples encountered in the field, including whether and to what degree the data samples processed by the ML model are within the scope of the training dataset used to train the model. As described in greater detail infra, the model deployment module 104 (or more particularly, the model scope evaluation component 106) can employ a scope model (scope model $112_1$) to perform this scope evaluation. In some embodiments, the model deployment module 104 can perform this scope evaluation prior to input of the data samples to the task specific ML model. The model deployment module 104 can also be configured to automatically apply a domain adaption element or domain adapted version of the ML model to those data samples determined to be outliers. The domain adapted element/version of the ML can include one or more elements (e.g., a feature extraction network) that has been tailored to the data samples at the deployment site. In the embodiment shown, the primary ML model $114_1$ corresponds to the task specific ML and the DA-ML model $116_1$ corresponds to the domain adapted element/version of the primary ML model $114_1$.

Throughout the description, the subscript numbers associated with the respective models are used to indicate a specific version of the model (e.g., version 1, version 2, etc.), wherein each subsequent version number is considered an updated version of the previous version. In the embodiment shown, the model deployment module 104 includes a version of each model denoted with subscript number 1 to indicate they are the "first" versions of the respective models deployed by the particular model deployment module 104. However, the specific version of the respective models deployed by the model deployment module 104 can change over time. In particular, as described in greater detail infra, in various embodiments, the active surveillance and learning module 124 can employ active learning techniques to generate an updated model set 138 including updated/improved versions of the current versions of the corresponding models being deployed at a particular site by an instance of the model deployment module 104. The active surveillance and learning module 124 can regularly perform model updating and provide the model deployment module 104 with the updated versions to replace the current model being deployed. These updated versions are respectively referred to as scope model $112_2$, primary ML model $114_2$ and DA-ML model $116_2$. The number of updated versions of the respective models that can be created by the active surveillance and learning module 124 and cycled back to the model deployment module 104 at a particular site is unlimited. In addition, in some implementations, the model deployment module 104 can receive updates to any of the models independently. For example, the model deployment module 104 can receive and replace an updated version of only one or two of the three models at time.

Throughout the description, the primary ML model 114 and the DA-ML model 116, regardless of the subscript number, respectively represent a ML model, algorithm, or architecture that is configured to perform a specific application or task on a specific type of input samples (e.g., the new data samples 102). The particular type of the ML model/algorithm/architecture, the type of the new data samples 102 and the particular task/function of the primary ML model 114 (and DA-ML model 116) can vary. For example, the primary ML model 114 (and the DA-ML model 116) can be or comprise one or more the deep learning models, neural network models, deep neural network models (DNNs), convolutional neural network models (CNNs), decision tree models, SVM models, regression analysis models, Bayesian network models, heuristic models, and other types of machine learning models. The primary ML model 114 (and the DA-ML model 116) can be configured to perform various inferencing tasks, such as classification tasks, segmentation tasks, detection tasks, regression tasks, and the like. In one or more example implementations, the primary ML model 114 (and DA-ML model 116) can be or correspond to an image processing model, such as a medical image processing model configured to process medical images and perform a classification/diagnosis task, a segmentation task, an image reconstruction task, or the like. With these implementations, the new data samples 102 can comprise medical images. However, it should be appreciated that the disclosed subject matter is not limited to image processing models or medical image processing models.

The term "unseen data" or "new data" refer to data samples that a deployed ML model (e.g., the scope model $112_1$, primary ML model $114_1$ and/or DA-ML model $116_1$) has not previously processed or evaluated during training and development. For example, an unseen or new data sample can include any data sample received by the model deployment module 104 for processing by the scope model $112_1$, the primary ML model $114_1$ and/or the DA-ML model $116_1$ after initial training and development of the currently deployed versions of the respective models has been completed. In this regard, the new data samples 102 can include data samples that were not included in a training dataset used to train and/or test, a deployed version of the scope model 112, the primary ML model 114, and/or the DA-ML model 116. For example, in implementations in which the model deployment module 104 is used by a particular medical system and the primary ML model 114 (and the DA-ML model 116) comprise medical image processing models, the new data samples 102 can include internally generated/received medical images for patients associated with the particular medical system. In this regard, in various embodiments, the model deployment module 104 can extract or otherwise receive the new data samples 102 from one or more data sources associated with and/or provided by the particular client site using the model deployment module 104 (e.g., via a wireless network and/or a wired connection).

In one or more embodiments, the DA-ML model 116 can include a version of the primary ML model 114 with an additional domain adaptation element or extension that provides one or more domain adaptation techniques to improve the accuracy of primary ML model 114 on data samples included in the new data samples 102 that were excluded from or otherwise under-represented in the training dataset used to train and develop the primary ML model 114. Domain adaptation refers to techniques for effectively adapting models trained on data samples from a source domain for inferencing on data samples from a new target domain. The ideal approach towards domain adaptation is that while training of the model itself the data used should be an unbiased representation of source and target domains.

In some embodiments, the DA-ML model 116 can be or correspond to a "domain adapted" DA version of the primary ML model 114. With these embodiments, one or more components (e.g., one or more networks of the primary ML model 114, portions of the one or more networks, one or more layers, etc.), of the primary ML model 114 can be trained using at least some data samples from the specific target domain with which the primary ML model 114 is being used and/or will be used. For example, as applied to medical image processing models, the target domain can comprise medical images from a particular client site (e.g., hospital, medical imaging system, etc.) where the primary ML model 114 will be deployed, that may differ relative to the training images used to train and develop the ML model 114 by the vendor. With this embodiments, the DA-ML model 116 can comprise one or more of the same components of the primary ML model 114 that were trained using a different training set relative to the training dataset used to train the same one or more components as included in the primary ML model 114. That is, the different training dataset can comprise training data samples assumed to have a higher degree of correspondence to the new data samples 102 relative to the training dataset. In some implementations, the training dataset used to train the DA-ML model 116 can comprise a portion of the data samples 102

In some embodiments, the primary ML model 114 can comprise a feature extraction network and one or more additional networks downstream from the feature extraction network. Assuming the new data samples 102 are associated with a target domain and the feature extraction network of the primary ML model 114 was trained based on first training data from a source domain, the DA-ML model 116 can comprise a different feature extraction network trained based on second training data from the target domain. For example, in some implementations of these embodiments, the feature extraction network of the primary ML model 114 can be trained using adversarial discrimination to extract same or similar features from both the source domain training dataset and the target domain training dataset. The resulting feature extraction network can then be considered a domain adapted feature extraction network and used with the DA-ML model 116. Additionally, or alternatively, the feature extraction network of the DA-ML model 116 can further trained using adversarial discrimination to extract one or more features exclusive to the source domain.

Figure 2:
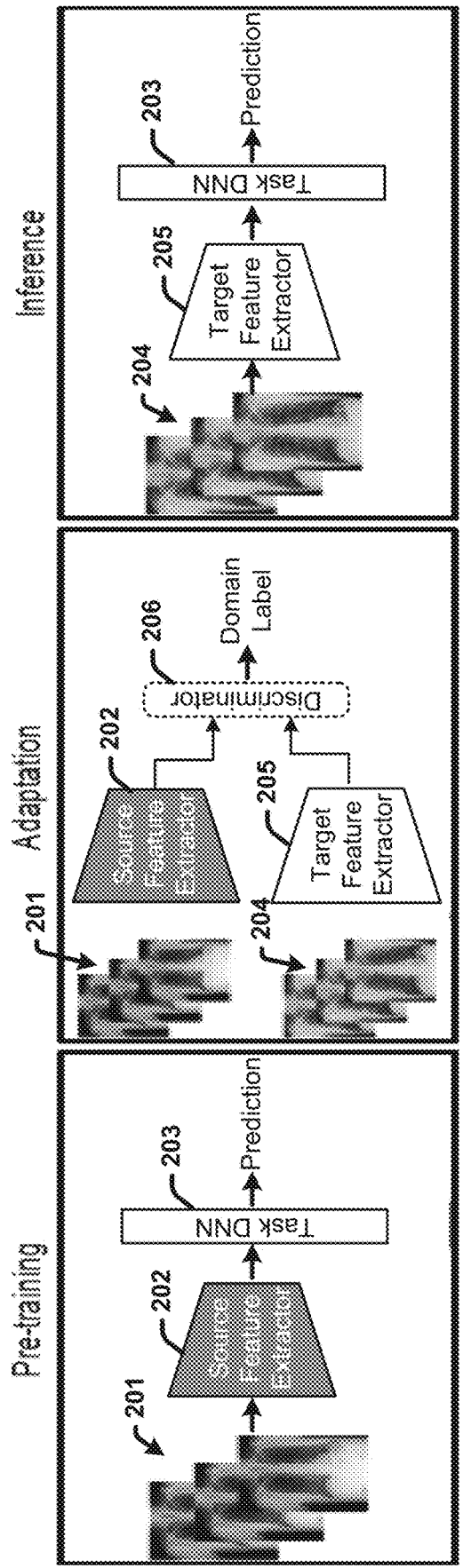
FIG. 2 presents an example illustration of adversarial discriminative domain adaptation method in accordance with one or more embodiments of the disclosed subject matter.

For example, FIG. 2. presents an example illustration of adversarial discriminative domain adaptation method 200 in accordance with one or more embodiments of the disclosed subject matter. In various embodiments, the primary ML Model 114 and DA-ML model 116 (regardless of the subscript number), include different feature extraction network (also referred to herein generally as a feature extractor) and a same task specific network, (also referred to as the task DNN). In accordance with these embodiments, the both the feature extractor and the task DNN of the primary ML model 114 can be trained with the same training dataset from a source domain, resulting in a source feature extractor 202 and a source task DNN (e.g., task DNN 203). In this context, adversarial discriminative domain adaptation involves using a discriminator network 206 to adjust the feature extractor portion of the ML model toward the new or unseen data such that the output is closer to what is seen during training. Once the feature extractor has been adapted, the adapted feature extractor can replace the source feature extractor in the DA-ML model 116 to generate the "domain adapted" version of the primary ML model 114.

For example, as shown in FIG. 2, adversarial discriminative domain adaptation include can include three phases, a pre-training phase, an adaptation phase, and in inference phase. In the pre-training phase, the source feature extractor 202 and the task DNN 203 are trained on a source domain training dataset 201. In the adaptation phase, a discriminator network 206 is then used to train a target feature extractor 205 on a second training dataset 204 that is from the target domain (e.g., the particular client site where the primary ML model 114 is being deployed or will be deployed). In the inferencing phase, the now trained target feature extractor 205 replaces the source feature extractor and is combined with the task DNN 203 trained using the source domain training dataset to generate the DA-ML model 116.

In this regard, with reference again to FIG. 1, in some embodiments, the DA-ML model 116 includes a different version of the feature extractor included in the primary ML model 114, yet the same task specific DNN. In this regard, both the DA-ML model 116 and the primary ML model 114 can include a task specific DNN trained on a first training data set from a source domain. However, the DA-ML model 116 can include a different version of the feature extractor trained on a second training data set that is tailored to a desired target domain. In this regard, the second training dataset can comprise data samples with a higher degree of correspondence to the new data samples 102 relative to the first training dataset. In another example, the second training dataset can comprise a subset of the new data samples 102 or other unseen data samples provided by the same source that provided the new data samples 102. Additionally, or alternatively, both the feature extractor and the task DNN portion of the DA-ML model 116 can be trained using a training dataset comprising samples from the target domain.

In other embodiments, the DA-ML model 116 can comprise a post-processing domain adaptation element and/or pre-processing domain adaptation element that can be used in combination with the primary ML model 114 to effectuate domain adaption of the primary DL model 114 for the target domain. For example, in one implementation of these embodiments, the DA-ML model 116 can comprise a post-processing ML that is trained to adjust and correct the output of the primary ML model 114 to account for errors that arise when the primary ML model 114 is applied to data samples from the target domain. In various embodiments, the post-processing model can comprise a shape autoencoder (SAE) consisting of an encoder network and a decoder network. With these embodiments, the encoder network can transform the inference output of the primary ML model 114 into a latent representation in feature space which is then decoded by the decoder network to generate an optimized or "domain adapted" output (e.g., a corrected segmentation mask, a more accurate classification, etc.). The post-processing model can be trained using unsupervised and/or semi-supervised machine learning techniques on training data with ground truth examples from only the source domain and/or from both the source domain and the target domain, depending on availability of training data.

In another embodiment, the encoder network of the trained SAE generated using the techniques described above can be used in a generative adversarial network (GAN) architecture to re-tune the primary ML model 114 for the target domain, resulting in the DA-ML model 116 which corresponds to a DA version of the ML model 114. For example, the encoder network can be used in a GAN network architecture to adapt the primary ML model 114 for same or enhanced accuracy on data samples from the target domain. In this regard, using a GAN framework, the trained shape encoder can be used as a discriminator network to help re-train parameters/weights of the source domain model (i.e., the generator) with an adversarial approach. This shape encoder can also act as a constraint for another feature-based discriminator which then updates the source domain model to match source domain input data samples and the target domain input data sample the feature space while imposing the shape constraint for the target domain Doing so results in better model convergence through stability of tuning the algorithm with the added shape constraint on the network.

With reference now to scope model (SM), in various embodiments, the scope model 112, (regardless of the version), can include a ML model configured to evaluate the scope of the new data samples 102 relative to a training dataset used to train the primary ML model 114 (and optionally another training dataset used to train the DA-ML model 116). For example, in some embodiments, the scope model 112 can include one or more ML models configured to do determine confidence scores for the new data samples 102 representative of a degree of confidence in the performance of the ML model on the new data samples 102. The type of ML model/architecture of the scope model 112 can vary. For example, the scope model 112 can be or comprise one or more the deep learning models, neural network models, DNNs, CNNs, decision tree models, SVM models, regression analysis models, Bayesian network models, heuristic models, and other types of machine learning models. In some embodiments, the scope model 112 can also employ a feature extraction network coupled with a task specific (e.g., outlier detection) network.

The scope model 112 can employ various techniques to determine the confidence score for the new data sample 102 reflective of the degree of confidence in the inferencing performance accuracy of ML model 114 on the new data samples 102. For example, the scope model 112 can employ inference dropout with prediction intervals estimated with Monte Carlo sampling, Bayesian deep networks, or the like). In another example the scope model 112 can determine the confidence scores that uses the outputs of model softmax layer to determine a threshold to optimize sensitivity while preserving precision at given confidence level. For example, this method can involve measuring the confidence score of unseen examples by finding the difference between output probabilities from the final softmax activation layer and the true probabilities.

In other embodiments, the scope model 112 can include outlier detection model configured to determine whether the new data samples 102 are inside the scope or outside the scope of the training dataset used to train the primary ML model 114 (and/or the DA-ML model 116). With these embodiments, a binary confidence score can be associated with the respective new data samples that reflects whether the same is an inlier or an outlier. For example, in one or more embodiments, the outlier detection model can include a model that was developed based on projection of the training dataset onto a standard feature space. In accordance with these embodiments, to measure similarity across image datasets, the outlier detection model can be generated by correctly predicted training data samples onto the standard feature space (e.g., ImageNet based on the VGG16 network). The outlier detection model is then trained and built based on a standard feature space to identify the inlier data samples. Such inlier samples are considered as confident samples for the primary ML model 114 as defined by the projected features from the training dataset. For example, in one or more embodiments, using a feature extractor algorithm, model or network (e.g., VGG or the like) trained based on the standard feature space, training feature vectors can be extracted for the respective training data samples in association with projection onto the standard feature space. The outlier detection model can then be developed and trained based on the training feature vectors to identify unseen data samples that are inliers relative to the training data set. In this regard, after the outlier detection model is developed and trained based on the training feature vectors, an unseen or new data samples can be individually projected onto a standard feature space to generate a feature vector for the data sample. This feature vector can further be passed through the trained outlier detector model to classify the data sample as either outliers or inliers. The primary ML model 114 can be considered to be confident on predictions on inlier samples as those samples are expected to be similar to the training dataset. Otherwise, the primary ML model 114 is not expected to be confident, and thus a prediction generated by the primary ML model 114 model based on outlier data samples are unreliable.

In the embodiment shown, the model deployment module 104 can include model scope evaluation component 106 to facilitate evaluating the scope of the new data samples 102 relative to the scope of the primary ML model 114, using the scope model 112. In this regard, the model scope evaluation component 106 can be configured to apply the scope model 112 to the respective new data samples 102 and generate an output that provides a measure/indication of the degree to which the new data samples are within the scope of the training dataset used to train the primary ML model 114. For example, in some implementations, the output of the scope model 112 can include a confidence score that indicates a degree of confidence in the primary ML model 114 to accurately infer on the respective data samples. Additionally, or alternatively, the output of the scope model 112 can include a classification for the data sample as either an outlier (e.g., outside the scope of the training dataset) or an inlier (e.g., inside the scope of the training dataset) in implementations in which the scope model 112 comprises an outlier detection model.

The model application component 108 of the model deployment module 104 can be configured to apply the primary ML model 114 and/or the DA-ML model 116 to the respective new data samples 102 to generate an inference output/result (e.g., a diagnosis, an organ segmentation mask, a reconstructed image, etc.). In some embodiments, model deployment module 104 can be configured to apply both the primary ML model 114 and the DA-ML model to the new data samples 102. With these embodiments, the outputs of both models can be compared (e.g., by the performance evaluation component 110 as discussed below) to facilitate evaluating the performance accuracy of the respective models in view of the scope model 112 results. In another embodiment, the model application component 108 can be configured to only apply the primary ML model 114 or the DA-ML model 116 to all received data samples.

Additionally, or alternatively, the model application component 108 can be configured to selectively apply either the primary ML model 114 or the DA-ML model 116 to an input data sample based on the results of the scope model 112. With these embodiments, the model scope evaluation component 106 can be configured to process each of the new data samples 102 using the scope model 112 before they are passed to the model application component 108 for processing using the primary ML model 114 or the DA-ML model 116.

For example, in some implementations, the model application component 108 can be configured to apply the DA-ML model 116 to those new data samples that are considered outside the scope of the primary ML model 114 because they received a low confidence score (e.g., relative to a threshold confidence score) or were otherwise determined to be outlier data samples based on the results of the scope model 112. The model application component 108 can alternatively apply only the primary ML model 114 to those data samples determined to be within the scope of the primary ML model (e.g., based on receiving a high confidence score by the scope model 112 and/or a determination that the data sample is an inlier data sample). In other implementations in which the DA-ML model 116 provides post-processing domain adaptation, for those data samples determined to be outside the scope of the primary ML model 114, the model application component 108 can apply both the primary ML model 114 and the DA-ML model 116 (e.g., apply the primary ML model 114 to generate an inference output and then apply the DA-ML model to the inference output to generate a corrected/optimized inference output).

In various embodiments, the processed data samples 102' and/or the results of the scope model 112, the primary ML model 114 and/or the DA-ML model 116 generated for the respective data samples 102 can be stored in a local archive database 120 (or another suitable datastore). The model deployment module 104 can further provide the active surveillance and learning module 124 access to the information included in the local archive database for usage in performing active surveillance and model updating as described in greater detail infra. Additionally, or alternatively, the model deployment module 104 can send the processed data samples 102' and/or the results of the scope model 112, the primary ML model 114 and/or the DA-ML model 116 generated for the respective data samples 102 to the active surveillance and learning module 124 which in turn can add the received data to the global archive database 122.

The site dashboard component 109 can generate an interactive dashboard that presents the inference results of the primary ML model 114 and/or the DA-ML model 116. This interactive dashboard is referred to herein as the site dashboard. In this regard, the site dashboard can comprise a graphical user interface (GUI) that presents the inference results and related information to an entity associated with the deployment site in an organized and useful way. In some embodiments, in addition to the inference outputs generated by the primary ML model 114 and/or DA-ML model 116 to the respective new data samples 102, the site dashboard can also include the scope model 112 results determined for each data sample (e.g., one or more confidence scores and/or a classification as an outlier or inlier).

The site dashboard can also present the processed data samples 102' and provide a mechanism for receiving feedback from one or more entities (reviewers) regarding the model results. For example, in some implementation, the site dashboard component 109 can provide a review prompt with one or more defined review questions regarding the model outputs that can be answered with predefined selectable response options and/or open text. The review questions can vary depending on the inferencing task of the primary ML model 114. In one or more embodiments, the review questions can include at least one question regarding the accuracy of the model outputs. For example, the review questions can ask the user to provide binary feedback stating whether the inference results are correct or incorrect. In another example, the review questions can ask the user to rate the accuracy of the model results using a defined rating/scoring scale. In some embodiments, the site dashboard can also provide a mechanism for reviews to provide feedback regarding identified errors in the inference results and/or corrections to the errors. In this regard, the site dashboard can allow users to manually annotate the processed data samples 102' with ground truth information identifying or indicating what the correct model outputs should. Received user feedback and data sample annotation information can further be stored in the local archive database 120 and/or sent to the active surveillance and learning module 124 for usage in performing active surveillance and model updating as described in greater detail infra.

FIG. 3 presents an example site dashboard 300 that facilitates evaluating model performance at deployment site in accordance with one or more embodiments of the disclosed subject matter. Site dashboard 300 presents one example GUI that can be generated by the site dashboard component 109 that facilitates reviewing the results of one or more ML models deployed at a client site using model deployment module 104. Site dashboard 300 can also facilitate receiving user feedback regarding the results. In various embodiments, site dashboard 300 can be presented to one or more entities associated with the deployment site using suitable review and visualization software and hardware.

In the embodiment shown, the site dashboard 300 can present the data sample 302 that was processed by the one or more ML models at the deployment site (e.g., the scope model 112, the primary ML model 114 and/or the DA-ML model 116). The site dashboard further provides a results window 304 that provides information regarding the results of the respective models. For example, the results window can include information identifying the results of the scope model 112 as applied to the data sample 302, such as a scope score (e.g., a confidence score) that represents the degree to which the data sample 302 is within the scope of the training dataset used to train the primary ML model 114. The scope results can also include information indicating whether the data sample 302 was classified as an outlier or inlier. The results window 304 can also include the actual model output generated by the primary ML model 114 and/or the DA-ML model 116 (whichever was applied). For example, the model results could include a classification for the data sample 302 (e.g., medical condition diagnosis), a segmentation mask (e.g., an organ segmentation mas) an image reconstruction, and the like. The model results will vary based on the type of the data sample 302 and the type of the ML model.

The site dashboard 300 can also include an annotation window 308 that can provide for marking up images data samples with annotation information in implementations in which the input data sample and/or the model output data comprise images. For example, the annotation window 308 can provided a toolbar 310 with selectable mark-up tools that can be used to mark-up the input image 302' to indicate output and/or the output image 304' to indicate any errors in the output.

The site dashboard 300 can also include a feedback window 306 that provides review questions related to the accuracy of the model results. The review questions can include predefined selectable answer options and/or allow a user to provide a textual description/answer in free form. In some implementations, once a user has completed the review form and/or the data sample annotation, the user can select to submit the feedback and the site dashboard 300 can be updated to present the user with the next processed data sample and associated model results for review. Feedback received for a data sample via the site dashboard 300 can further be associated with the data sample as stored in the local archive database 120, included in one or more evaluation reports 118 and/or used by the performance evaluation component 110 (and/or performance evaluation component 110').

With reference again to FIG. 1, in some embodiments the model deployment module 104 can further include performance evaluation component 110 and reporting component 111 to facilitate evaluating the performance of the applied ML model (e.g., the primary ML model 114 or the DA-ML model 116) on the new data samples and generating evaluation reports 118 within information regarding the model performance. In some embodiments, the performance evaluation component 110 can generate performance metrics for the respective models based on the results of the scope model 112 and received user feedback. In particular, the performance evaluation component 110 can generate performance metrics that identify the amount of inlier and outlier data samples. In implementations in which the scope model 112 generates confidence scores for the respective data samples, the performance evaluation component 110 can also generate performance metrics regarding the distribution of the confidence scores. The performance evaluation component 110 can also evaluate the received user feedback regarding the accuracy of the inference outputs and generate performance metrics for the primary ML model 114 and the DA-ML model 116 regarding their degree of accuracy. The performance evaluation component 110 can also generate usage metrics regarding frequency of application of the primary ML model 114 and the DA-ML model.

In some embodiments in which the model application component 108 applies both the primary ML model 114 and the DA-ML model 116 to an input data sample, the performance evaluation component 110 can also evaluate the performance of the respective models based on comparison of the results. In this regard, in implementations in which a data sample was determined to be an outlier by the scope model 112 or otherwise associated with a low confidence score, the result of the DA-ML model 116 for the data samples should be more accurate than the result of the primary ML model 114. The performance evaluation component 110 can thus evaluate both results in view of the user feedback to determine whether the DA-ML model 116 provides improved results for outlier data samples as it intended. The performance evaluation component 110 can further provide one or more performance metric for the DA-ML model 116 that measures whether and to what degree the DA-ML model 116 provides improved results for outlier data samples relative to the primary ML model 114. In some embodiments, the model performance metrics determined by the performance evaluation component 110 can be included in the site dashboard.

The model deployment module 104 can further include reporting component 111 to generate one or more evaluation reports 118 including information that summarizes and tracks the usage and performance of the scope model 112, the primary ML model 114 and the DA-ML model at the deployment site. For example, the reporting component 111 can be configured to generate an evaluation report 118 according to a defined schedule (e.g., once an hour, once a day, once a week, once a month, etc.) and/or upon request. An evaluation report 118 can include but is not limited to, information identifying the inference results and scope model results determined for each data sample, received user feedback and/or annotation information, and/or the performance and usage metrics determined by the performance evaluation component 110.

In some embodiments, the reporting component 111 can store the evaluation reports 118 in the local archive database 120. The model deployment module 104 can further provide the active surveillance and learning module 124 access to the evaluation reports 118 as included in the local archive database for usage in performing active surveillance and model updating as described in greater detail infra. Additionally, or alternatively, the model deployment module 104 can send the evaluation reports 118 (or any of the information included the evaluation reports 118) to the active surveillance and learning module 124 in response to generation thereof (e.g., once an hour, once a day, once a week, once a month, etc.).

The active surveillance and learning module 124 can further employ the information included in the evaluation reports 118 and/or stored in the local archive database 120 to facilitate monitoring the performance of models deployed at multiple client sites and updating the models when poor performance is observed. In particular, in various embodiments, multiple deployment sites can use a locally deployed instance of the model deployment module 104. Each instance of the model deployment module 104 can employ a model set including a scope model 112, a primary ML model 114 and a DA-ML model 116, wherein at least the DA-ML model 116 at each comprises a version that that is tailored to the client site's input dataset. The respective sites can each employ the features and functionalities of the model deployment module 104 to process their respective input datasets and provide the active surveillance and learning module 124 with their evaluation reports 118 and associated information (e.g., their processed data samples, their model results, their received user feedback, their performance metrics, etc.). In some embodiments, the active surveillance and learning module 124 can aggregate the information received from each client site and present the information in a dashboard in a manner that provides a global perspective of the performance of the respective model sets deployed at each client site.

Figure 4:
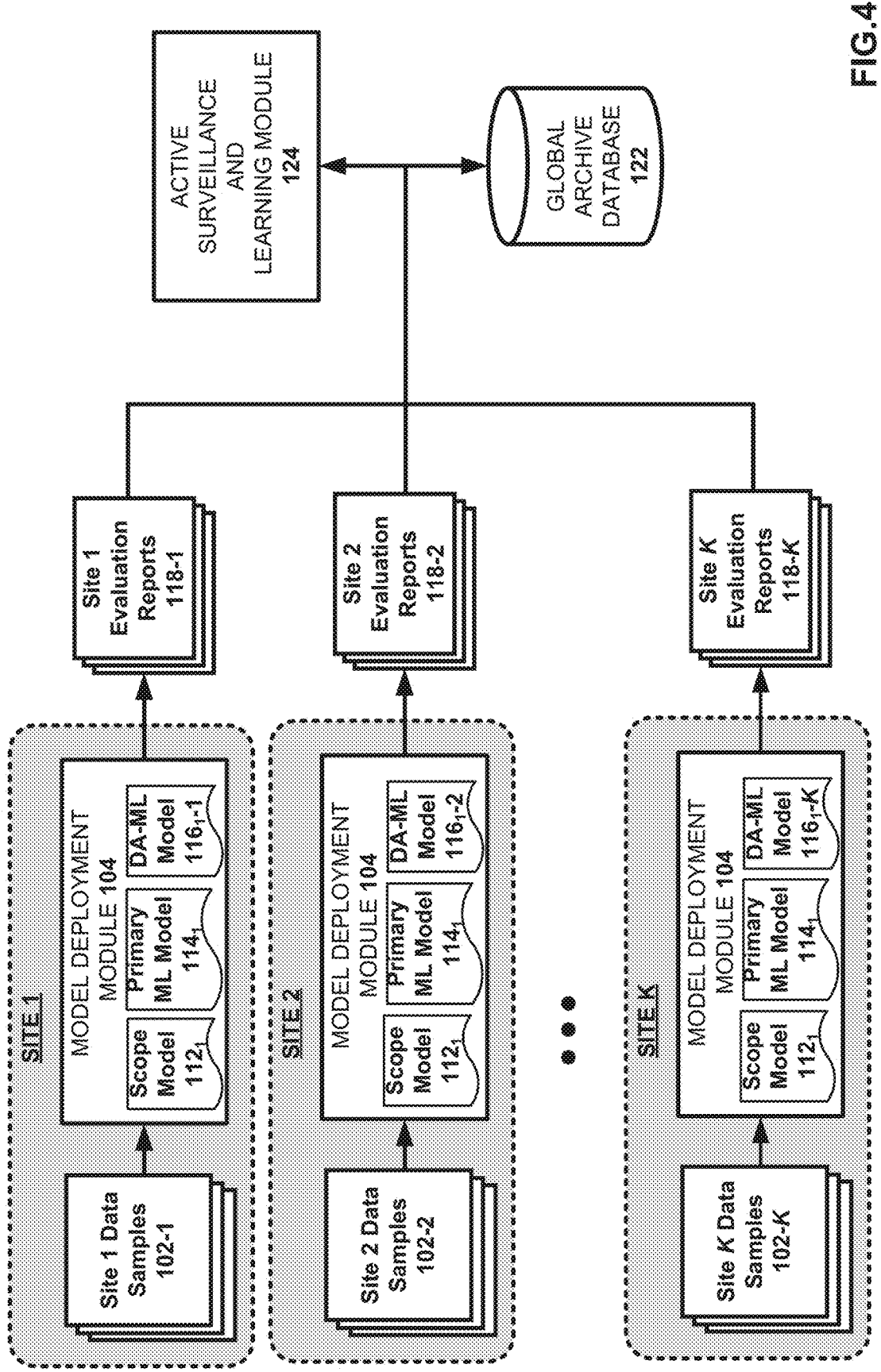
FIG. 4 provides an illustration of an example, non-limiting system that facilitates active surveillance for ML model deployment workflows in accordance with one or more embodiments of the disclosed subject matter.

In this regard, FIG. 4 provides an illustration of an example, non-limiting system 400 that facilitates active surveillance and learning for multiple deployment sites in accordance with one or more embodiments of the disclosed subject matter. Repetitive description of like elements employed in respective embodiments is omitted for sake of brevity.

In the embodiment shown, a plurality of different client sites identified as sites 1-K (wherein K can include any integer) can each include an instance of the model deployment module 104 for performing active surveillance regarding the performance of the models deployed at the respective sites on their respective data samples (respectively identified as site 1 data samples 102-1, site 2 data samples 102-2 and site K data samples 102-K. In this regard, site 1 can include a model deployment module 104 for performing active surveillance regarding the performance of the deployed models including the scope model $112_1$, primary ML model $114_1$ and DA-ML model $1161_1$-1, wherein DA-ML model $1161_1$-1 has been tailored/adapted to site 1 data samples 102-1. Likewise, site 2 can include a model deployment module 104 for performing active surveillance regarding the performance of the deployed models including scope model $112_1$, primary ML model $114_1$ and DA-ML model $1161_1$-2, wherein DA-ML model $1161_1$-2 has been tailored/adapted to site 2 data samples 102-2. In addition, site K can include a model deployment module 104 for performing active surveillance regarding the performance of the deployed models including scope model $112_1$, primary ML model $114_1$ and DA-ML model $1161_1$-K, wherein DA-ML model $1161_1$-K has been tailored/adapted to site K data samples 102-K.

In one example implementation in which the primary ML model 114 comprises a medical imaging processing model for example, the different sites can include different medical imaging centers or hospitals and the respective DA-ML models at each site can be tailored to the medical images that are unique to each medical imaging center or hospital. The respective model deployment modules 104 can further facilitate generating site-specific evaluation reports and/or evaluation information (respectively identified as site 1 evaluation reports 118-2, site 2 evaluation reports 118-2, and site K evaluation reports 118-K). In this regard, the site specific evaluation reports can include (but is not limited to), the inference results and the scope model results determined for respective data samples, received user feedback and/or annotations, and/or model performance and usage metrics determined by the performance evaluation component 110. In some embodiments, the respective sites can also send or otherwise provide the processed data samples with the respective evaluation reports. The respective sites can further send or otherwise provide their site-specific evaluation reports and associated information to the active surveillance and learning module 124. For example, in some embodiments, the site-specific evaluation reports and associated information (and optionally the processed data samples for each site) can be be collected and aggregated into the global archive database 122. The active surveillance and learning module 124 can further access the global archive database 122 to retrieve the archived information for performing active surveillance and model updating.

In this regard, with reference back to FIG. 1, in some embodiments, the active surveillance and learning module 124 can include a vendor dashboard component 126 that generates a dashboard presenting the model performance metrics for different sites regarding the performance of the model sets at each of the sites. This dashboard is referred to herein as the vendor dashboard. In this regard, the vendor dashboard can comprise a GUI that presents model performance information for the different deployment sites to one or more entities associated with the vendor in an organized and useful way that facilitates tracking and monitoring model performance at the respective sites over time. For example, in some embodiments, the vendor dashboard component 126 can generate one or more charts, graphs, tables, etc. that compare the performance metrics for the respective models deployed at each deployment site. The vendor dashboard component 126 can further regularly update the charts, graphs, tables, etc., overtime as new performance metrics are received/determined. In some embodiments, the vendor dashboard component 126 can generate one or more charts, graphs, tables, etc. for each deployment site based on their respective model performance metrics that tracks changes in performance metrics for the respective models in their model set over time.

As described above, in some embodiments, the model performance metrics for the respective models deployed at each site can be included in the evaluation reports 118. With these embodiments, the vendor dashboard component 126 can extract the performance metrics for each site from the received evaluation reports 118 and employ the extracted performance metrics to generate the charts, graphs, tables, etc., presented in the vendor dashboard. Additionally, or alternatively, the active surveillance and learning module 124 can generate the model performance metrics for the respective models deployed at the respective sites using performance evaluation component 110'. For example, the performance evaluation component 110' can provide same or similar features and functionalities as performance evaluation component 110. In this regard, in some embodiments, the performance evaluation component 110 can be removed from the model deployment module 104 and the model performance evaluation can instead be performed at the active surveillance and learning module 124 using the performance evaluation component 110'. With these embodiments, for each deployment site, the performance evaluation component 110' can determine the model performance metrics based on information including (but not limited to), the scope model results and the inference results for the primary ML model 114 and the DA-ML model 116 in view of user feedback indicating the accuracy of the inference results. The performance evaluation component 110' can access this information for each deployment site as included in the global archive database 122 and/or the local archive databases 120 associated with each site.

Figure 5:
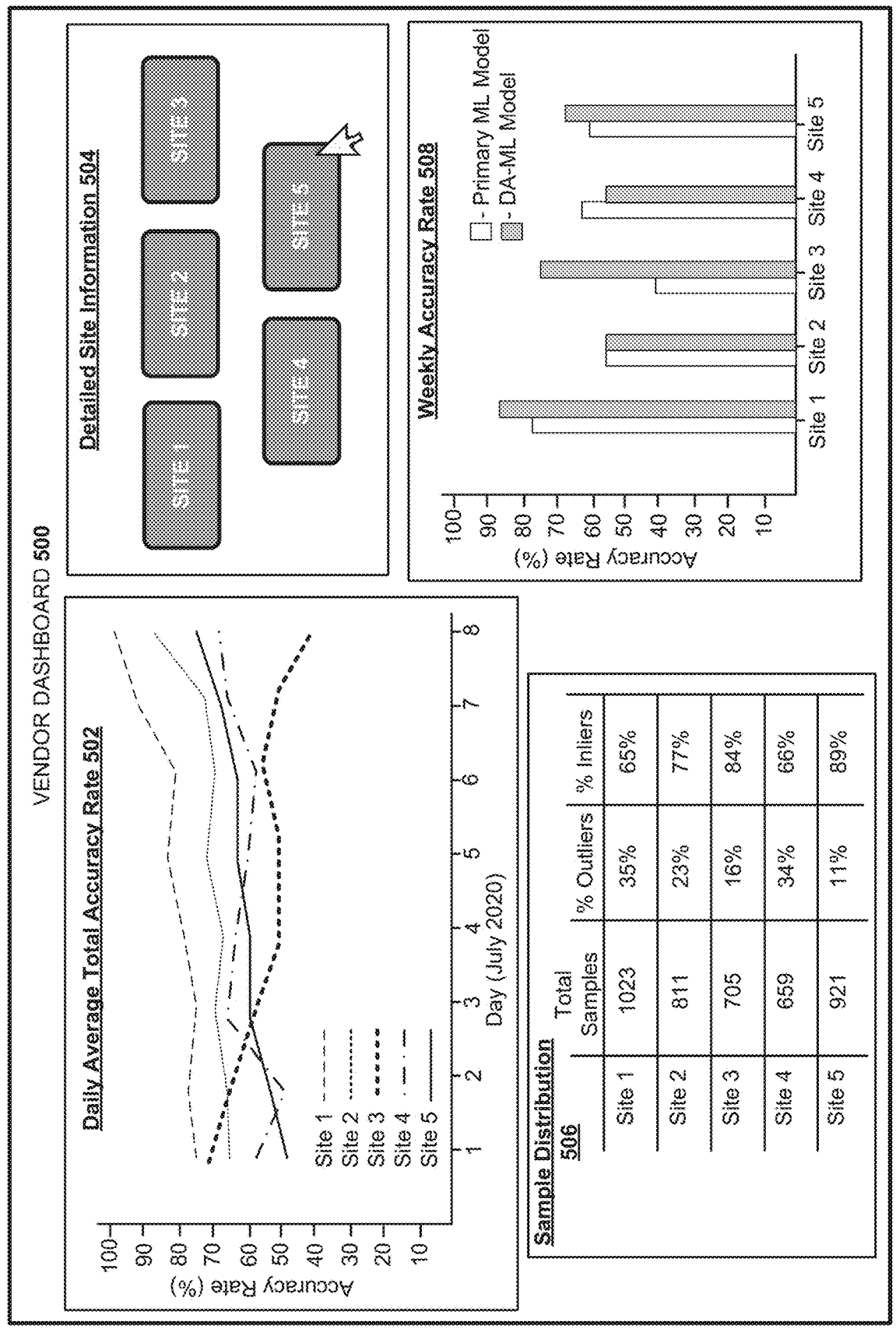
FIG. 5 presents an example vendor dashboard that facilitates evaluating model performance at multiple deployment sites in accordance with one or more embodiments of the disclosed subject matter.

FIG. 5 presents an example vendor dashboard 500 that facilitates evaluating model performance at multiple deployment sites in accordance with one or more embodiments of the disclosed subject matter. Vendor dashboard 500 presents one example GUI that can be generated by the vendor dashboard component 126 that facilitates reviewing the performance metrics for the ML model sets deployed at different client sites using their respective model deployment modules 104. Five different client sites are represented in vendor dashboard 500 respectively identified as site 1, site 2, site 3, site 4, and site 5. In various embodiments, vendor dashboard 500 can be presented to one or more entities associated with the vendor site (e.g., that executes the active surveillance and learning module 124) using suitable review and visualization software and hardware.

In the embodiment shown, the vendor dashboard 500 include a graph 502 that charts the average total accuracy rate of the inferencing models deployed at the respective sites. For example, in some implementation, the average total accuracy rate can correspond to the combined average accuracy rate of all three models included in the respective model sets deployed at the client sites (e.g., scope model 112, the primary ML model 114 and the DA-ML model 116). Additionally, or alternatively, the accuracy rate measured in graph 502 can correspond to the average accuracy rate of the primary ML model 114 and the DA-ML model 116, only the primary ML model 114, only the DA-ML model 116. In some implementations, different graphs can be generated for the accuracy rates of each of the different models.

The vendor dashboard 500 further includes sample distribution information 506. The sample distribution information provides the total number of data samples processed using the ML models at each of the sites to date. The sample distribution information 506 further provides the total percentage of outlier and inlier data samples. The sample distribution information 506 can be updated in real-time, daily, weekly, or the like.

The vendor dashboard 500 also include a site information window 504 that provides selectable icons for each of the different sites. In various embodiments, selection of an icon for a site can result in generation and presentation of a site-specific dashboard that provides more detailed information regarding model performance and usage tracked for each site.

The vendor dashboard 500 also include a bar graph 508 that compares the weekly accuracy rate of both the primary ML model and the DA-ML model at each site. In this regard, the weekly accuracy rate of the primary ML model and the DA-ML model for each site can be measured separately.

With reference again to FIG. 1, in some embodiments, the active surveillance and learning module 124 can also include monitoring component 128 that monitors the performance of the models deployed at each (or in some implementations one or more) deployment site based on the performance metrics. In some embodiments, the monitoring component 128 can further determine when a model (e.g., any of the models included in a set) is underperforming and/or otherwise needs updating based on the monitoring and one or more defined performance criterion for each model and/or each model set, and/or deployment site/scenario. For example, the one or more defined performance acceptability criterion can include but are not limited to: a maximum amount of outlier data samples, a minimum average confidence score for the data samples, a minimum performance accuracy level for the primary ML model 114 and/or a minimum performance accuracy level for the DA-ML model 116. The performance acceptability criterion can be tailored based on the needs and preferences of the respective deployment sites.

In this regard, in some embodiments, for each (or in some implementations one or more) client site, the monitoring component 128 can be configured evaluate the performance metrics included in the evaluation reports 118 and/or otherwise determined by the performance evaluation component 110 and/or performance evaluation component 110' to determine whether and to what degree the new data samples 102 are within the scope of the deployed primary ML model 114. In some implementations, the monitoring component 128 can further can determine when an update to the primary ML model 114 and/or the DA-ML model 116 is needed based on the amount of the new data samples 102 determined to be outside the scope of the primary ML model 114 (e.g., if X % of new data samples are outside the scope, an update may be needed) and/or the degree to which they are outside the scope (e.g., based on the confidence scores or another measure). The monitoring component 128 can also evaluate the performance accuracy metrics for the primary ML model 114 and/or the DA-ML model 116 to determine if and/when the performance accuracy of the respective models falls below desired performance level and is thus underperforming.

In some embodiments, the monitoring component 128 can generate notifications regarding models and/or model sets whose performance metrics fall below desired performance criterion. For example, based on determination that a model is underperforming the monitoring component 128 can generate a notification identifying the model and indicating that the model is underperforming. In another example, the monitoring component 128 can generate a notification regarding a deployment site's dataset failing to satisfy a defined scope requirement (e.g., based on the amount of outlier data samples, the average confidence scores, etc.). The monitoring component 128 can further render the notification in the vendor dashboard, provide the notification to one or more entities associated with the vendor (e.g., using a suitable electronic notification mechanism), and/or provide the notification to one or more entities associated with the deployment site where the underperforming model and/or dataset is deployed (e.g., using a suitable electronic notification mechanism).

Additionally, or alternatively, based on a determination that one or more models in a model set (wherein the model set includes the scope model 112, the primary ML model 114 and the DA-ML model 116) deployed at a client site is underperforming and/or a client site's dataset fails to satisfy a scope requirement as described above, the monitoring component 128 can direct the active surveillance and learning module 124 to initiate an active learning based model update process to generate an updated version of the underperforming model or models. In other embodiments, the active surveillance and learning module 124 can be configured to perform the active learning based model updating process for a model or model set regularly (e.g., in accordance with a defined update schedule regardless as to whether the performance metrics indicate the model/model set is underperforming).

In this regard, in addition to the vendor dashboard and the active monitoring functions described above, the active surveillance and learning module 124 can further be configured to generate and/or facilitate updating and improving one or more of the scope model 112, the primary ML model 114 and/or the DA-ML model 116 for one or more deployment sites. The active surveillance and learning module 124 can thus improve the adoption of feedback on at least one deployed ML model (e.g., ML model 114 and/or DA-ML model 116) from at least one deployment site.

The active learning/model updating process described herein involves employing active learning techniques to retrain and update one or more of the models for a particular deployment site (e.g., the SM, the primary ML model 114 and/or the DA-ML model 116) using new training/test data. In some embodiments, the new training/test data can include processed data samples 102' provided by the particular deployment site that models or models have demonstrated poor performance on. With these embodiments, the active surveillance and learning module 124 can access information included in the global archive database 122 and/or the local archive database 120 identifying processed data samples 102' that were determined to be outliers and/or otherwise associated with low confidence scores (e.g., less than a threshold confidence score). The active surveillance and learning module 124 can further extract the outlier data samples from the global archive database 122 or the local archive database 120 (or wherever they may be stored) and employ the outlier data sampled to update/retrain the one or more models.

In other embodiments, the data samples included in the new training/test data can include new data samples provided by the particular deployment site that have not been processed by the respective models (e.g., the scope model 112, the primary ML model 114 and/or the DA-ML model 116). In some implementations of these embodiments, the sample preparation component 130 can further filter the new data samples using the scope model 112 to generate a subset of outlier data samples and use these outlier data samples as the new training/test set for model updating. Still in other embodiments, the new training/test data can include new and/or processed data samples provided by other deployment sites. In this regard, the active surveillance and learning can generate a more comprehensive training/test dataset for updating one or more of the models that provides a distribution of different data samples from different deployment sites.

In some implementations, at least some of the samples included in the new training/test dataset to be used for model updating can also include or otherwise be associated with additional information (e.g., included in the evaluation reports 118 for those data samples), including but not limited to, the model results (e.g., the inference results of the applied current version of the primary ML model 114 and/or the DA-ML model 116), the confidence scores, user feedback information, (e.g., applied annotations regarding accuracy of the inference results), annotation information (e.g., ground truth annotations) and the like.

Additionally, or alternatively, the active surveillance and learning module 124 can facilitate curating or annotating at least some of the data samples included in the new training/test dataset by at least one human expert to generate annotated data for the training/test data samples. For example, the at least one human expert can provide GT annotations for the data samples, annotation information regarding the accuracy of the inference results, and the like. The active surveillance and learning module 124 can further facilitate updating a version of the deployed ML model 114, a version of the deployed scope model 112, and/or a version of the deployed DA-ML model 116 using the new training/testing dataset comprising the annotated data samples and optionally additional non-annotated training/testing data samples that are similar to the annotated data samples (e.g., outlier data samples from the same site or similar to data samples from another site). In some implementations, the test data samples can include a randomly selected subset of the archived data samples for the specific site.

The active surveillance and learning module 124 can further evaluate the updated models using one or more defined performance criterion for the updated models. The active surveillance and learning module 124 can further continue to iteratively update the models (e.g., the scope model 112, the primary ML model 114 and/or the DA-ML model 116) if the one or more performance criterion are not met or outputting the final models for sending to the client site for updating the currently deployed versions of the respective models at the client site. In the embodiment shown in system 100, the final updated models that meet the performance criteria are collectively grouped as the updated model set 138.

To facilitate active learning-based model updating, the active surveillance and learning module 124 can include sample preparation component 130, annotation component 132, model updating component 134, and updated model evaluation component 136.

In one or more embodiments, the sample preparation component 130 can extract or otherwise receive the new training/test data samples and relevant associated information if available (e.g., annotations, user feedback, confidence scores, outlier/inlier classifications, etc.) and prepare the data samples and associated information for active learning processing.

In some embodiments, in which the data samples were not previously processed by the current versions of the scope model 112, the primary ML model 114 and/or the DA-ML model 116, the sample preparation component 130 can process the data samples using the current version of the models to generate an intermediate curated dataset. (The sample preparation component 130 can alternatively be configured to process all data samples included in a retrieved new training/test dataset for model updating in this manner even if they were previously processed at the deployment site using the current version of the models). With these embodiments, the sample preparation component 130 can apply the current version of the scope model 112 (e.g., scope model $112_1$) to the data samples to identify and extract the outlier data samples. In this regard, the outlier data samples correspond to the data samples classified as outside the scope of the previous training dataset used to develop the current version of the primary ML model 114 being deployed at the client site. The sample preparation component 130 can further apply the current version of the primary ML model 114 (e.g., primary ML model $114_1$) and/or a current version of the DA-ML model 116 (e.g., DA-ML model $116_1$) to the outlier data samples to generate inference results. The sample preparation component 130 can further associate the inference results determined for the respective outlier data samples using the primary ML model 114 and/or the DA-ML model therewith to generate the intermediate curated dataset.

The annotation component 132 can further facilitate application of manual annotations to the intermediate curated data samples (e.g., by one or more experts), resulting in transforming the intermediate curated data samples into annotated data samples ready for model training and/or testing. In this regard, the annotation component 132 can provide the intermediate curated data to one or more expert entities for manual review and generation of the annotation information for the respective data samples. The annotation component 132 can further receive the applied annotation information.

The annotation information can include information that indicates the accuracy of the performance of the respective models. For example, the annotations can include information stating whether and to what degree the reviewer considers the model output accurate. In some implementations in which the model output is inaccurate, the annotations can also include ground truth information providing the correct output result and/or indicating or identifying what is inaccurate with the model's inference output. For example, as applied to an inaccurate image segmentation task generated by the primary ML model 114, the annotation data can include information marking the input image where the correct segmentation mask should be. In another example, as applied to a classification task and an inaccurate diagnosis for a medical image generated by the primary ML model 114 and/or the DA-ML model 116, the annotation data can include information associated with the medical image stating the correct diagnosis.

The model updating component 134 can further employ the curated dataset including the annotated data samples to train and update one or more of, the current version of the scope model 112, the current version of the primary ML model 114, and/or the current version of the DA-ML model 116. The updated model evaluation component 136 can further evaluate the performance of the updated versions of the respective models based on defined performance criteria for the respective models (e.g., defined accuracy thresholds/levels) in accordance with existing machine learning testing and validation processes using test data samples (e.g., provided by the client site). If the defined performance criteria are not met, the active surveillance and learning module 124 can further iteratively continue the updating process using new sets of data samples (e.g., new sets of archived data) until the defined performance criteria are not met. The updated model evaluation component 136 can further accept the updated versions of the respective models if the defined performance criteria are met, resulting in accepting the updated versions as the updated model set 138. Based on acceptance of the updated model set, the active surveillance and learning module 124 can further send one or more of the updated models (e.g., the updated scope model $112_2$, the updated primary ML model $114_2$, and/or the updated DA-ML model $116_2$) back to the ML model deployment module 104. Based on reception of the updated models, the model deployment module 104 can replace the current versions of the respective models being deployed at the client site with the updated versions.

Figure 6:
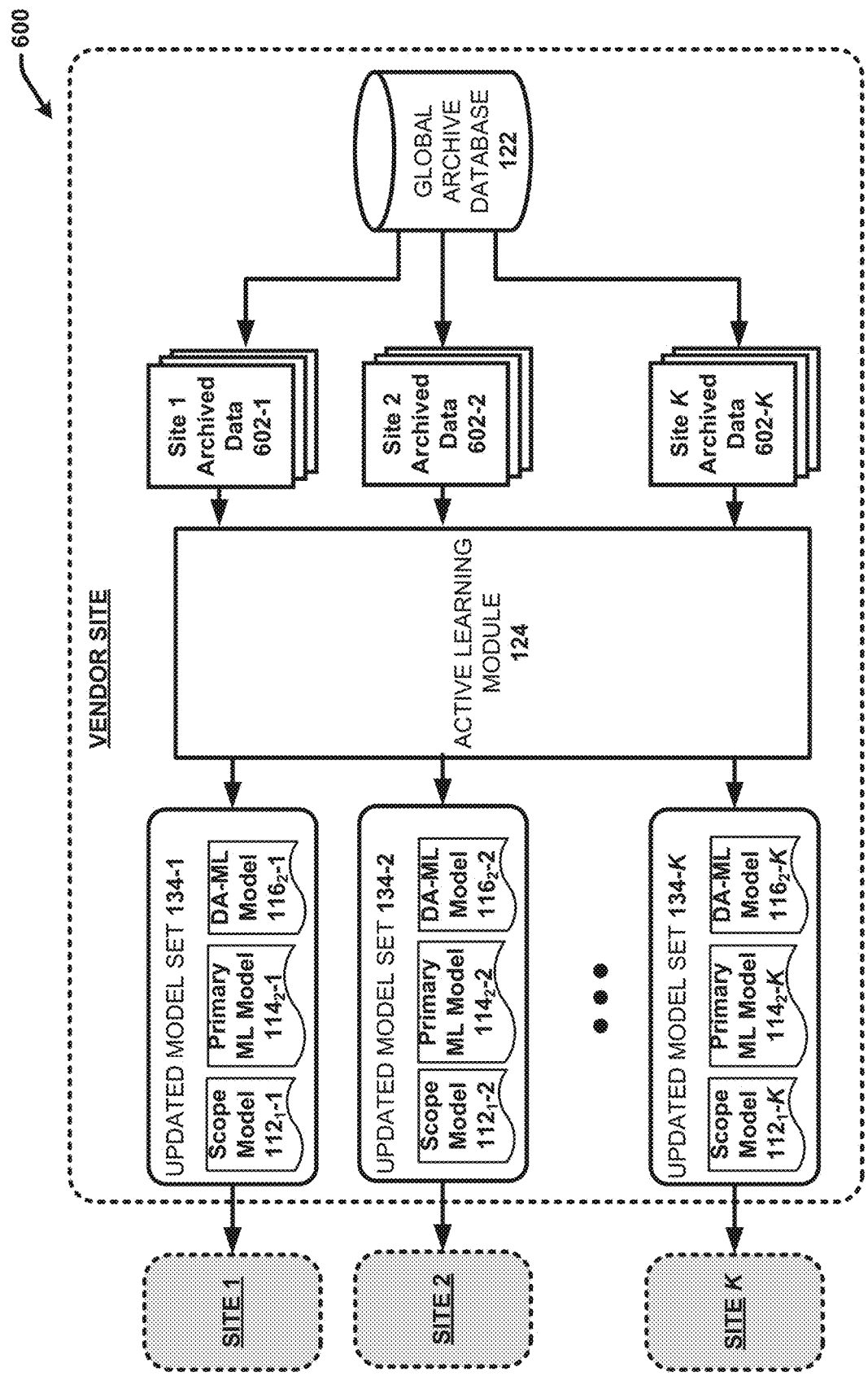
FIG. 6 provides an illustration of an example, non-limiting system that facilitates active learning for ML model authoring workflows in accordance with one or more embodiments of the disclosed subject matter.

FIG. 6 provides an illustration of an example, non-limiting system 600 that facilitates active learning for ML model authoring workflows in accordance with one or more embodiments of the disclosed subject matter. Systems 600 particularly demonstrates an example system architecture that facilitates performing active learning and model updating by a centralized vendor for a plurality of model deployment sites. Repetitive description of like elements employed in respective embodiments is omitted for sake of brevity.

In the embodiment shown, a centralized vendor site can include the active surveillance and learning module 124 and the global archive database 122. In this embodiment, the global archive database 122 can include the processed data samples 102' from the respective sites and their associated evaluation report information. In some implementations, the global archive database 122 can also include additional unpossessed data samples from the respective deployment sites. In this regard, the active surveillance and learning module 124 can access and retrieve archived data samples and associated evaluation report informaiton (e.g., if available) as included in the global archive database 122 for each of the specific sites (e.g., sites 1-K) respectively identified in FIG. 4 as site 1 archived data-1, site 2 archived data-2), and site K archived data-K. The active surveillance and learning module 124 can further employ the site-specific archived data to generate updated model sets for each of the sites respectively comprising updated versions of the scope model 112, the primary ML model 114 and/or the DA-ML model 116 that are tailored to each site.

For example, in the embodiment shown, the active surveillance and learning module 124 can generate an updated model set 138-1 for site 1 based on the site 1 archived data 602-1 (e.g., site 1 data samples and associated evaluation report information if available), wherein the updated model set 138-1 for site 1 comprises a second (updated) version of the scope model 112 for site 1 (identified as scope model $112_2$-1), a second (updated) version of the primary ML model 114 for site 1 (identified as primary ML model $114_2$-1), and a second (updated) version of the DA-ML model 116 for site 1 (identified as DA-ML $116_2$-1). The active surveillance and learning module 124 can also generate an updated model set 138-2 for site 2 based on the site 2 archived data 602-2 (e.g., site 2 data samples and associated evaluation report information if available), wherein the updated model set 138-2 for site 2 comprises a second (updated) version of the scope model 112 for site 2 (identified as scope model $112_2$-2), a second (updated) version of the primary ML model 114 for site 2 (identified as primary ML model $114_2$-2), and a second (updated) version of the DA-ML model 116 for site 2 (identified as DA-ML $116_2$-2). The active surveillance and learning module 124 can also generate an updated model set 138-K for site K based on the site K archived data 602-K (e.g., site 1 data samples and associated evaluation report information if available) and so on. In this regard, the vendor site can extract site specific archived data and process the respective data samples to generated tailored versions of the scope model 112, the primary ML model 114 and the DA-ML model 116 for each site.

Figure 7A:
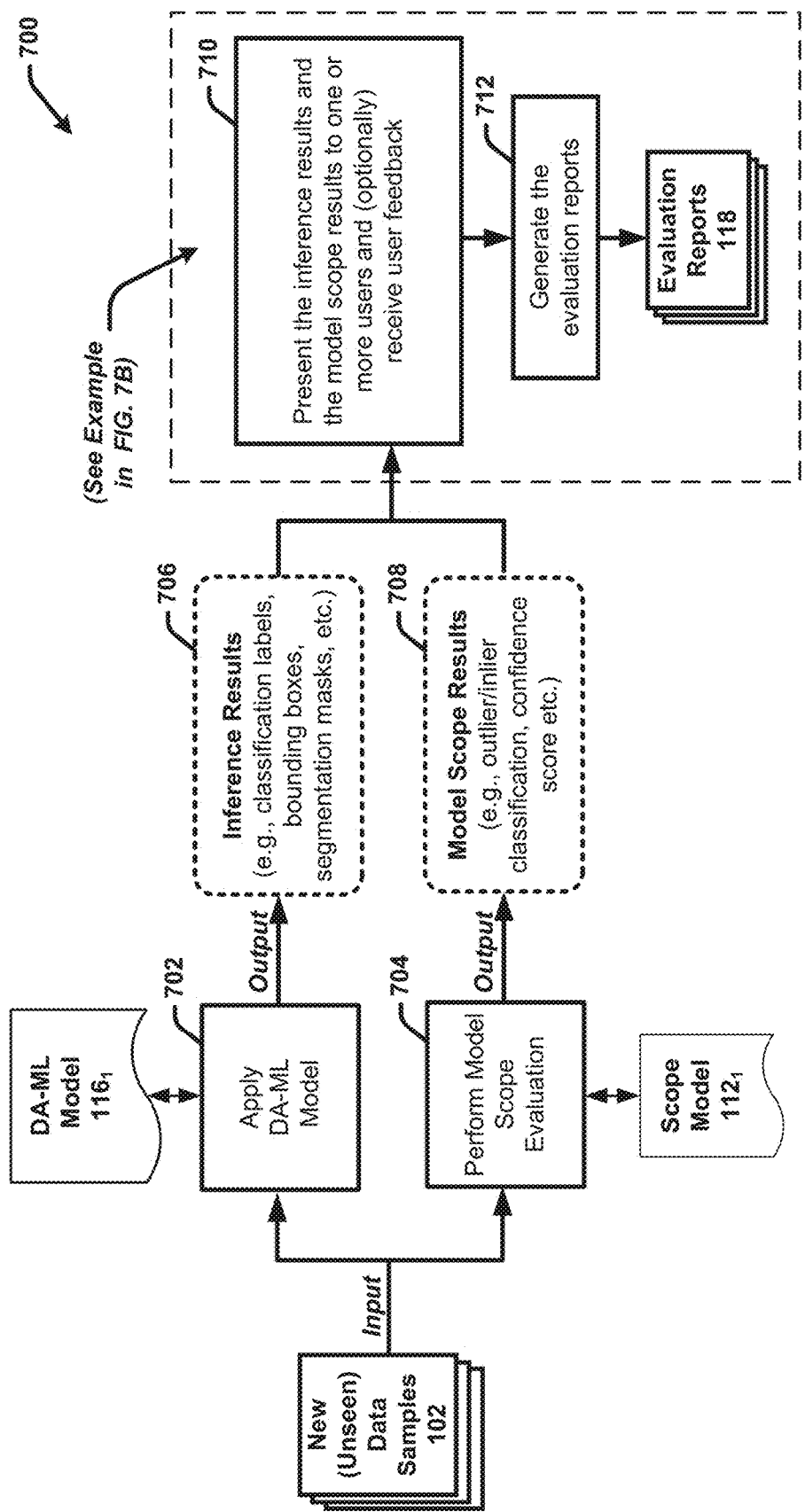
FIG. 7A presents a flow diagram of an example, non-limiting, active surveillance workflow in accordance with one or more embodiments of the disclosed subject matter.

FIG. 7A presents a flow diagram of an example, non-limiting, active surveillance workflow 700 for performance at a client site in accordance with one or more embodiments of the disclosed subject matter. In one or more embodiments, the active surveillance workflow 700 can be performed and/or facilitated by the model deployment module 104. Repetitive description of like elements employed in respective embodiments is omitted for sake of brevity.

With reference to FIG. 7A, at 702, new data samples 102 can be initially received and processed using the DA-ML model $116_1$ to generate inference results 706 (e.g., classification labels, bounding boxes, segmentation masks, etc. In some embodiments in which the DA-ML model 116 is used as a post-processing domain adaptation element, at 702, the primary ML model 114 can be first applied to the new data samples 102 and the DA-ML model 116 can be applied to the inference outputs of the primary ML model 114 as a post-processing step. The type of the inference results 706 can vary depending on the specific inferencing task performed by the DA-ML model 116 (and/or the primary ML model 114 when the DA-ML model is used for post-processing domain adaptation) and the type of the input data samples.

The new data samples 102 can also be evaluated at 704 using the scope model 112₁ to determine the scope of the new data samples relative to the scope of the primary ML model 114₁. The model scope evaluation can result in the generation of model scope results 708 for the respective new data samples, which can include (but are not limited to) information classifying the respective new data samples as outliers or inliers, confidence scores representative of a degree of confidence in the primary ML-model's ability to accurately inference on the respective new data samples, and the like. At 710, the inference results and the model scope results can be presented to one or more users (e.g., via site dashboard 300 or the like), and feedback can (optionally) be received. For example, the feedback can include (but is not limited to), information regarding user evaluated performance accuracy and/or specificity of the DA-ML model 116 and/or the scope model 112, user provided annotations regarding corrections and/or adjustments to the inference results to render them more accurate, and the like. At 712, the evaluation reports 118 can be generated (e.g., via the reporting component 111) and at 714, the evaluation reports can be sent to the global archive database 122 (and/or directly to the vendor dashboard component 126).

In this regard, the active surveillance workflow 700 incorporates domain adaptation building into the ML model to facilitate improving the accuracy of the inference results 706. The active surveillance workflow 700 further generates and provides a confidence score for the respective data samples that provides an indication of how confident the system is in the performance ability of the primary ML model 114 on the respective new data samples. As a result, data samples associated with low or poor confidence scores (or outliers) can be more easily identified and flagged for deeper evaluation and usage in updating the ML model 114 in the active learning workflows. In summary, the active surveillance workflow 700 involves receiving new data samples 102 at a client site and instead of (or in addition to) applying the primary ML model 114 to the new data samples, applying the domain the DA-ML model 116₁, which has been tailored to the target domain of the client site's data. The active surveillance workflow 700 further involves generating confidence scores for the new data samples that represent a measure of confidence in the primary ML model 114 to infer on the new data samples. These confidence scores and the inference results can further be presented to one or more reviewers to provide feedback. Finally, the active surveillance workflow 700 stores the received feedback along with the ML outputs and the evaluated confidence scores in a global archive database 122.

Figure 7B:
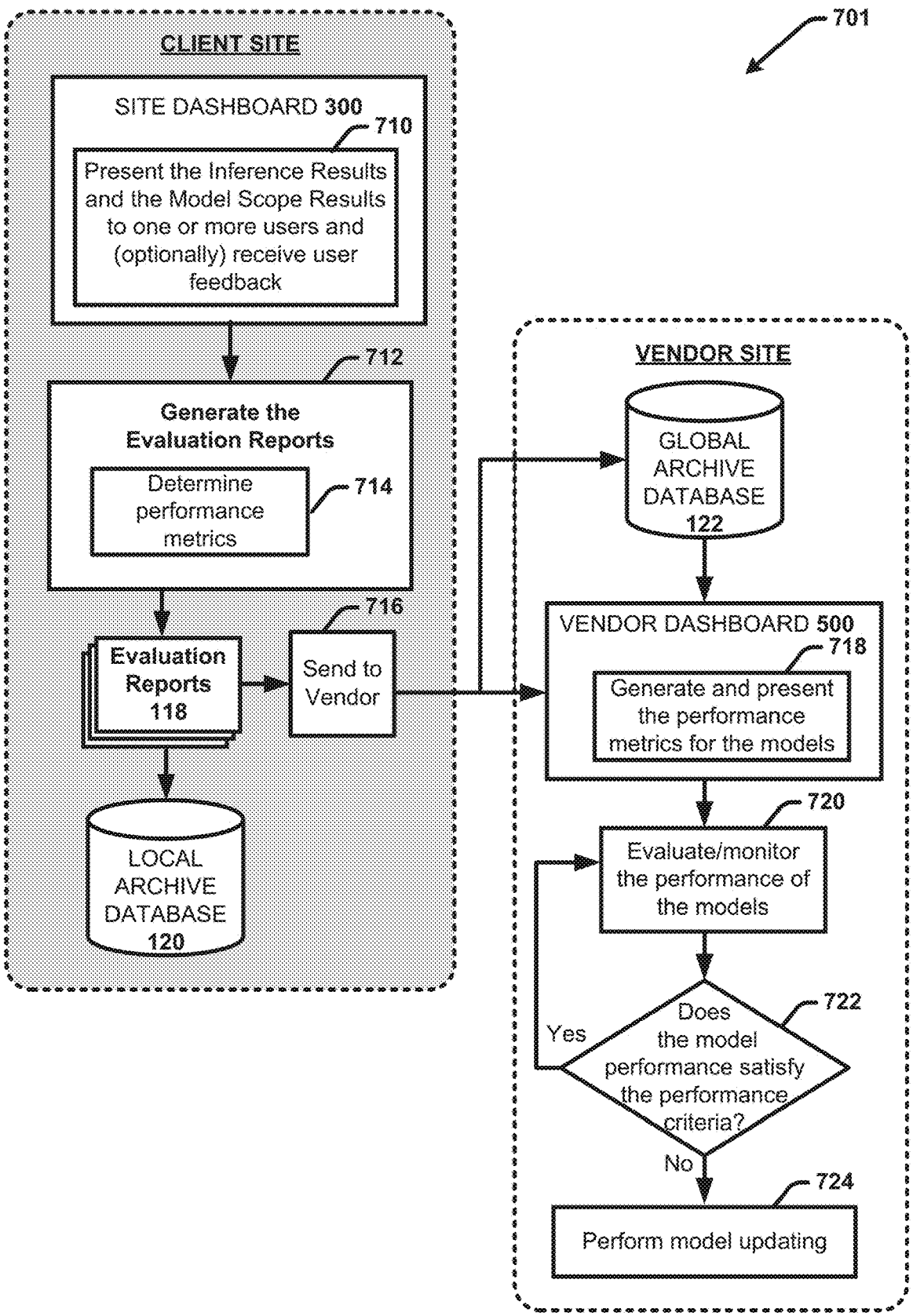
FIG. 7B presents a flow diagram of an example performance evaluation and reporting process of the active surveillance workflow in accordance with one or more embodiments of the disclosed subject matter.

FIG. 7B presents a flow diagram of an example performance evaluation and reporting process of the active surveillance workflow 701 in accordance with one or more embodiments of the disclosed subject matter. In the embodiment shown, both the client site and the vendor site can evaluate can perform provide active surveillance elements using separate dashboards in accordance with one or more embodiments.

For example, with respect to the client or deployment site, at 710, the inference results and the scope model results can be presented to one or more users at the client site via a site dashboard 300 and user feedback can optionally be received regarding the performance accuracy of the inference results. For example, at 710 a reviewer at the client site can examine the inference outputs generated by the primary ML model 114 and/or the DA-ML model 116 and provide feedback indicating whether and to what degree the inference outputs are correct. In some implementations, the reviewer can further annotate the data samples to indicate errors in an incorrect inference output (e.g., boundary boxes where the correct segmentation region should be on an image, notes correcting an incorrect model generated diagnosis, etc.).

At 712, the system at the client site (e.g., using reporting component 111) can generate one or more evaluation reports 118 based on the received user feedback and the model outputs (e.g., the inference results and the scope results). For example, the evaluation reports can be generated regarding model performance over defined periods of time (e.g., once a day, once a week, once a month, etc.) and/or for a defined number of data samples (e.g., every N data processed data samples). In some embodiments, in association with generating the evaluation reports 712, the performance evaluation component 110 at the client site can further determine and generate model performance metrics for inclusion in the evaluation reports at 714. Additionally, or alternatively, the performance metrics can be determined by the active surveillance and learning module 124 (e.g., using performance evaluation component 110'). At 716, the model deployment module 104 at the client site can further send the generated evaluation reports 118 to the active surveillance and learning module 124 at the vendor site. The client site can also store the evaluation reports 118 in a local archive database 120 along with the processed data samples.

At the vendor site, the using the active surveillance and learning module 124 can store the evaluation reports 118 in the global archive database 122. As described with reference to FIG. 4, the active surveillance and learning module 124 can aggregate evaluation report information received from multiple client sites in the global archive database 122. At 718, the vendor dashboard component 126 can further generate and present the performance metrics for the models respectively deployed at different sites in a vendor dashboard. In some implementations in which the performance metrics are not included in the evaluation reports, the performance evaluation component 110' at the vendor site can determine the performance metrics based on the information included in the evaluation reports. At 720 the monitoring component 128 (and/or a manual reviewer) can evaluate and monitor the performance of the models based on the information presented in the vendor dashboard. At 722, the monitoring component 128 (and/or a manual reviewer) can determine whether the performance of an individual model at any site and/or a model set at any site fails to satisfy defined performance criteria. If not, the system can continue to monitor the performance of the models as new information is received over time. However, if at 722 the system determines that the model performance fails to satisfy defined performance criteria, then at 724, the system can initiate/perform model updating for the underperforming model or model set.

Figure 8:
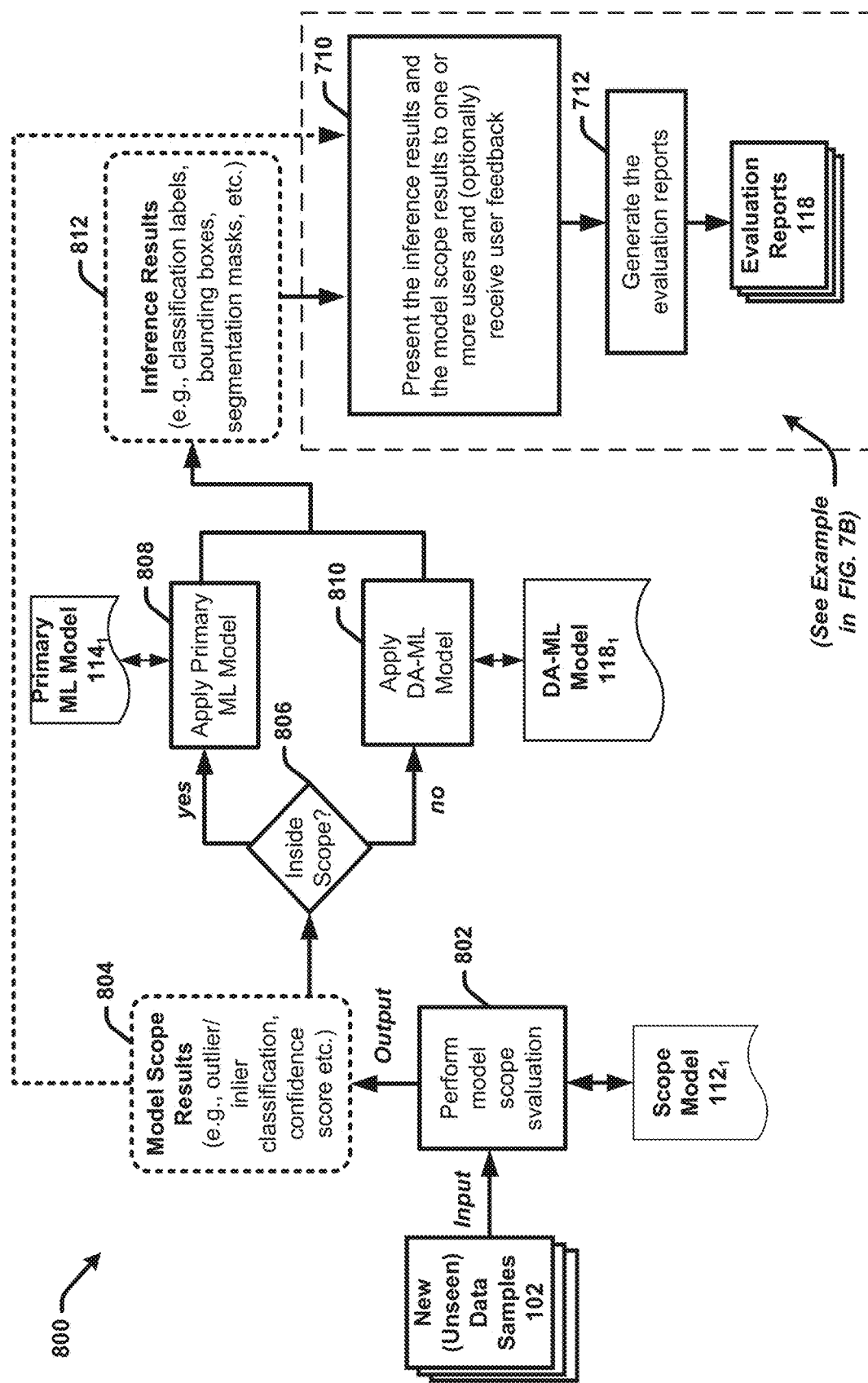
FIG. 8 presents a flow diagram of another example, non-limiting, active surveillance workflow in accordance with one or more embodiments of the disclosed subject matter.

FIG. 8 presents a flow diagram of another example, non-limiting, active surveillance workflow 800 for performance at a client site in accordance with one or more embodiments of the disclosed subject matter. In one or more embodiments, the active surveillance workflow 800 can be performed and/or facilitated by the model deployment module 104. Repetitive description of like elements employed in respective embodiments is omitted for sake of brevity.

With reference to FIG. 6, at 802, new data samples 102 can be initially received by the model deployment module 104 and each of the new data samples 102 can be evaluated by the model scope evaluation component 106 using the scope model 112 to determine the scope of the new data sample relative to the scope of the primary ML model 114 to generate model scope results 804. The model scope results 804 can include for example, a confidence score for each new data sample that indicates a degree to which the data sample is within the scope of the training data set and/or a classification of the data sample as an outlier or inlier. At 806, the model scope evaluation component 106 can determine whether each new data sample is inside the scope of the primary ML model 114 based on the confidence score relative to a defined threshold and/or the outlier/inlier classification. At 808, the model application component 108 can apply the primary ML model 114 to the inlier data samples to generate inference results 812. At 810, the model application component 108 can instead apply the DA-ML model 116 to those outlier data samples to generate the inference results 812. The active surveillance workflow 800 can further continue in accordance with 710 and 712 as described with reference to FIGS. 7A and 7B.

Figure 9:
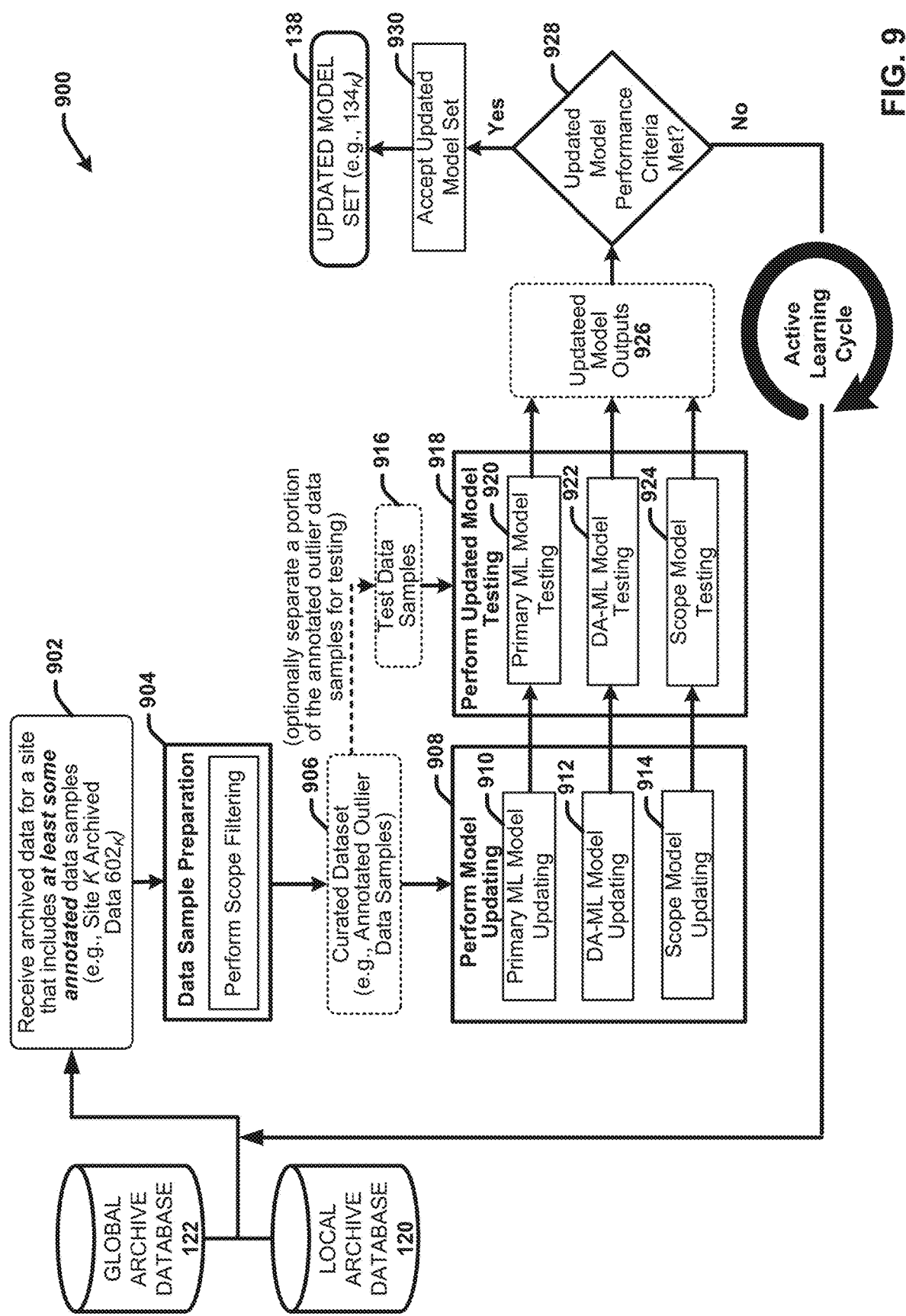
FIG. 9 presents a flow diagram of an example active learning workflow for DNN model authoring in accordance with one or more embodiments of the disclosed subject matter.

FIG. 9 presents a flow diagram of an example active learning workflow 900 for ML model authoring in accordance with one or more embodiments of the disclosed subject matter. In one or more embodiments, the active learning workflow 900 can be performed and/or facilitated by the active surveillance and learning module 124. Repetitive description of like elements employed in respective embodiments is omitted for sake of brevity.

In accordance with active learning workflow 900, at 902, the active surveillance and learning module 124 can receive or otherwise access (e.g., in the global archive database 122 and/or the local archive database 120) archived data for a site (e.g., client site K) that includes as least some already annotated data samples and/or associated evaluation report information for updating one or more of the primary ML model 114, the scope model 112 and/or the DA-ML model 116. At 904, the active surveillance and learning module 124 can perform data sample preparation (e.g., using the sample preparation component 130). In the embodiment shown, the data sample preparation can involve filtering the data samples using model scope filtering to select a subset of those data samples that are outside the scope of the current version of the primary ML model 114 deployed at the client site.

For example, active learning-based ML model updating is generally used to improve the performance of a ML on data samples that the ML tends to demonstrate poor performance on. Often times, this poor performance can be attributed to the data samples being excluded from or otherwise underrepresented in the training dataset (e.g., types of data samples the model has not seen). In accordance with some embodiments of the disclosed active learning techniques, data samples from a particular client site (e.g., site K) that were outside the scope of the primary ML model 114 deployed at the client site can be identified in the global archive database 122 based their associated confidence score or outlier classification as determined based on application of the scope model 112 at the client site.

In this regard, with reference to FIG. 9 in view of FIG. 1, using the evaluation reports associated with the respective data samples included in the global archive database 122, at 904, the sample preparation component 130 can identify and retrieve a subset of the data samples classified as outliers and/or otherwise associated with low confidence scores (e.g., relative to a threshold confidence score). The active surveillance and learning module 124 can further employ these outlier data samples to retrain and update the primary ML model 114 along with the DA-ML model 116 and/or the scope model 112 based on annotation information associated with the respective data samples identifying or indicating whether and/or how/why the inference outputs by the respective models on these outlier data samples are inaccurate. In accordance with active learning workflow 900, such annotation information can be previously associated with the respective data samples in the global archive database 122 (e.g., as received in association with user review feedback at the client site and/or the vendor site).

For example, in some implementations, the data samples included in the global archive database 122 can be associated with annotation data provided ground truth and/or identifying or indicating the accuracy of performance of the scope model 112 on the respective data samples (e.g., whether and to what degree the confidence score correlated with the degree of accuracy of the primary ML model inference output). In addition, data samples included in the global archive database to which the primary ML model 114 was applied can also be associated with annotation data regarding accuracy of performance of the primary ML model 114 on those data samples. For example, those data samples can be associated with information indicating whether and to what degree the inference results generated by the primary ML model 114 for the respective data samples were accurate, and if not what the correct inference results should have been. Likewise, for those data samples to which the DA-ML model 116 was applied, those data sample can also be associated with annotation data regarding accuracy of performance of the DA-ML model 116 on those data samples. For example, those data samples can be associated with information indicating whether and to what degree the inference results generated by the DA-ML model 116 the respective data samples were accurate, and if not what the correct inference results should have been.

In accordance with active learning workflow 900, the data sample preparation 904 can result in the generation of a curated dataset 906 comprising the outlier data samples from the client site K with their associated annotated data regarding model performance accuracy and errors/corrections to the inference outputs described above. At 908, the model updating component 134 can then employ the curated dataset 906 to update one or more of: at 910, the current version of the primary ML model $114_1$ deployed at the client site; at 912, the current version of the DA-ML model $116_1$ deployed at the client site; and/or at 914, the current version of the scope model $112_1$, deployed at the client site.

At 918, the updated model evaluation component 136 can further perform updated model testing using test data samples 916. In some embodiments, the test data samples 916 to can comprises a subset of the outlier data samples randomly selected and removed from the curated dataset 906 (e.g., wherein the removed test data samples were not used for model updating at 908). Additionally, or alternatively, the test data samples 916 can comprise a new set of data sample from the client site. In this regard, using the test data samples 916, at 920 the updated model evaluation component 136 can test the performance of the primary ML model, at 922 the performance of the DA-ML model and, and at 924, the performance of the scope model. At 928, the updated model evaluation component 136 can evaluate the respective updated model outputs 926 against defined performance criteria (e.g., defined accuracy requirements, etc.) to determine whether the defined performance criteria has been met. If at 928, the defined performance criteria has been met, then at 930, the updated model evaluation component 136 can accept the updated model set 138. The updated model set 138 can further be sent back to the client site as a model update and the model deployment module 104 can be configured to employ the updated model set 138 instead of the previous versions of the scope model 112, the primary ML model 114 and/or the DA-ML model 116. However, if at 928 the updated model evaluation component 136 determines that the updated model performance criteria has not been met, then the active learning cycle can continue, and the active learning workflow 900 can be repeated using a new set of training/test data samples and associated evaluation reports extracted from the global archive database 122 until the updated performance criteria is met.

Figure 10:
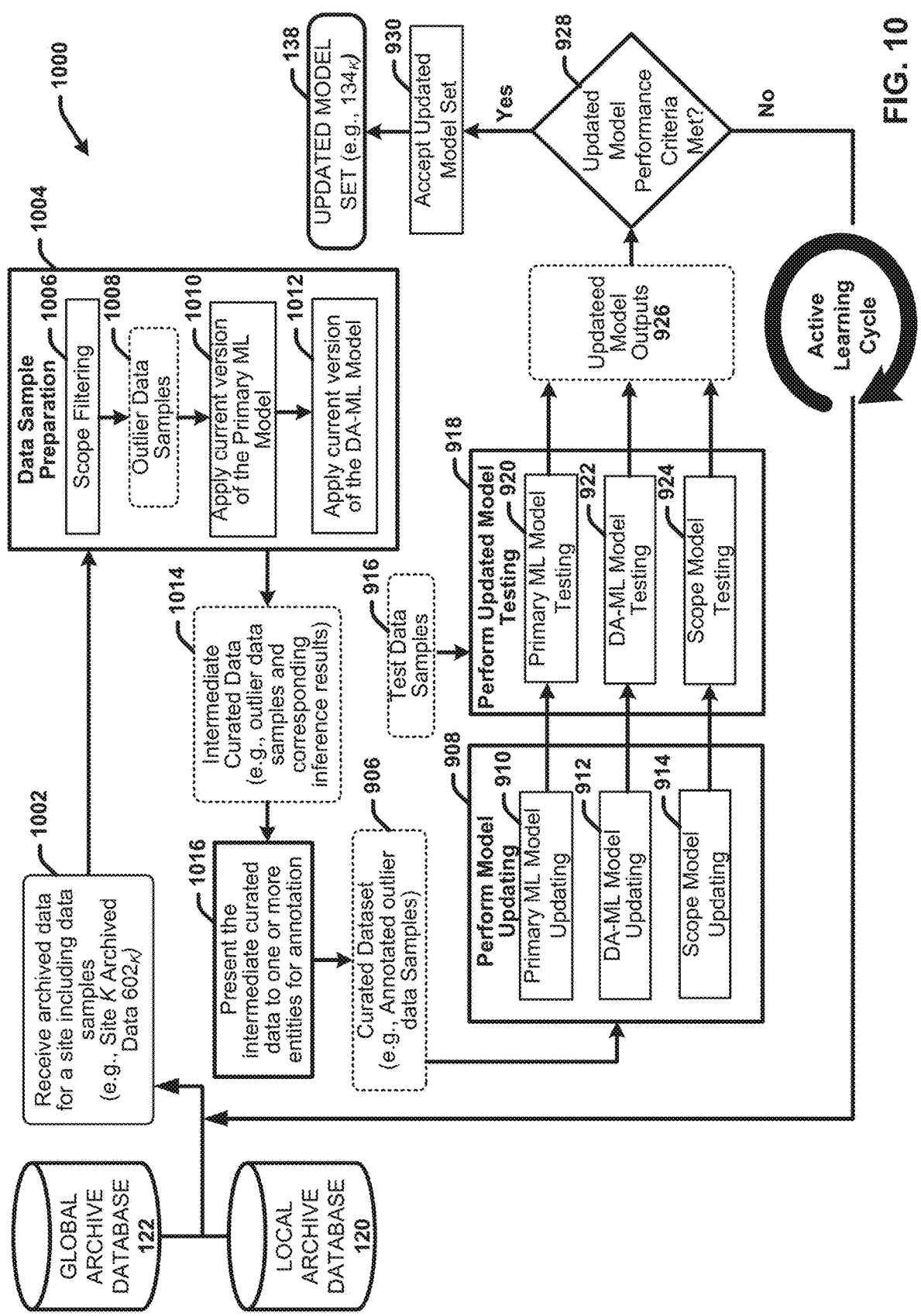
FIG. 10 presents a flow diagram of another example active learning workflow for ML model authoring in accordance with one or more embodiments of the disclosed subject matter.

FIG. 10 presents a flow diagram of another example active learning workflow 1000 for ML model authoring in accordance with one or more embodiments of the disclosed subject matter. Repetitive description of like elements employed in respective embodiments is omitted for sake of brevity.

Active learning workflow 1000 is similar to active learning workflow 900 with differences with respect to the generation of the curated dataset 906. In this regard, the model updating at 908 using the curated dataset 906, the model testing at 918 and the continued active learning processes of active learning workflow 1000 can proceed in a same or similar manner as described with reference to active learning workflow 900. Active learning workflow 1000 differs from active learning workflow 900 however with respect to the generation of the curated dataset 906. In particular, with active learning workflow 900, annotated information regarding accuracies and inaccuracies in the outputs of the respective models (e.g., the scope model 112, the primary ML model 114 and/or the DA-ML model 116) on the outlier data samples and/or ground truth information was already associated with the outlier data samples as received from the global archive database 122 and/or the local archive database 120. With active learning workflow 1000, the active surveillance and learning module 124 facilitates generating this annotation information (e.g., using annotation component 132).

In particular, at 1002, the active surveillance and learning module 124 can receive archived data for a site, the archived data including data samples from the site or data samples otherwise representative of a particular target domain for the primary ML model 114. In some implementations, the data samples can include unprocessed data samples provided by the client site. In this regard, the new data samples received at 1002 can include data samples received from the client site that were not previously proceed by the model deployment module 104 or the active surveillance and learning module 124.

At 1004, the sample preparation component 130 can prepare the new data samples for the active learning cycle. In one or more embodiments, this can initially involve performing model scope filtering at 1006 to identify and extract the outlier data samples 1008. In some embodiments, the sample preparation component 130 can perform model scoping by applying a current version of the scope model 112 to the respective new data samples to generate the confidence scores and/or otherwise identify and extract the outliers. At 1010, the data sample preparation can further involve applying the current version of the primary ML model 114 to the outlier data samples 1008 to generate inference outputs by the primary ML model. At 1012, the data preparation can also involve applying the current version of the DA-ML model 116 to the outlier data samples 1008 to generate inference outputs by the DA-ML model 116. The outlier data samples and the inference outputs generated based on application of the current version of the primary ML model 114 and/or the current version of the DA-ML model 116 can be collected and aggregated as intermediate curated data 1014. Then at 1016, the annotation component 132 can facilitate presenting the intermediate curated data 1014 to one or more reviewing entities (e.g., one or more humans/experts) to generate and apply annotations to the respective curated data samples (as appropriate) regarding the performance accuracy of the respective models, identifying accuracies and inaccuracies in the model outputs, providing the ground truth, and the like, resulting in generation of the curated dataset 906. The model updating and testing can then proceed as described with reference to active learning workflow 900.

Figure 11:
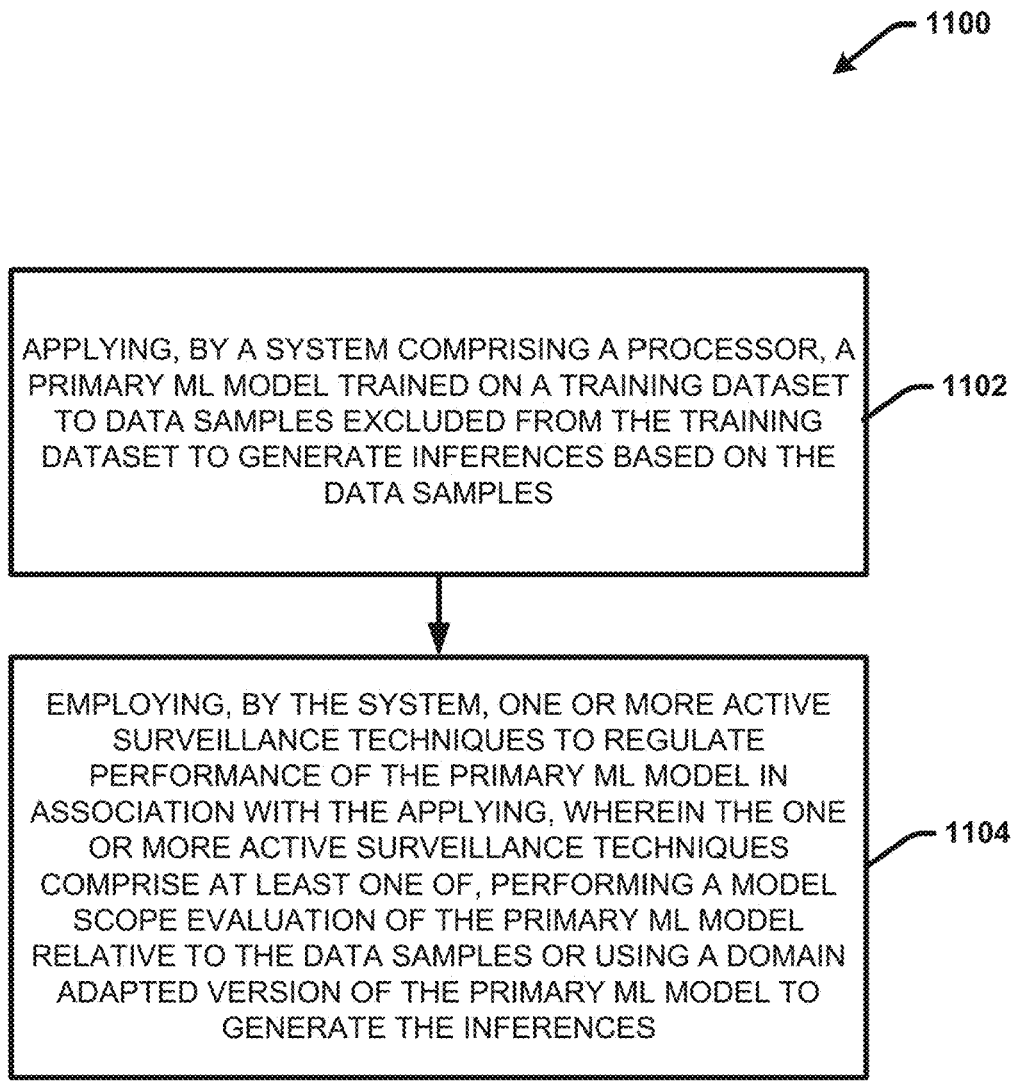
FIG. 11 illustrates a flow diagram of an example, non-limiting process for performing active surveillance for ML model deployment workflows in accordance with one or more embodiments of the disclosed subject matter.

FIG. 11 illustrates a flow diagram of an example, non-limiting process 1100 for performing active surveillance for ML model deployment workflows in accordance with one or more embodiments of the disclosed subject matter. Repetitive description of like elements employed in respective embodiments is omitted for sake of brevity.

At 1102, a system comprising a processor (e.g., system 100, system 400 and/or system 600), can apply a primary ML model (e.g., primary ML model 114) trained on a training dataset to data samples excluded from the training dataset (e.g., new data samples 102) to generate inferences based on the data samples (e.g., using model deployment module 104). At 1104, the system can employ more active surveillance techniques to regulate performance of the primary ML model 114 in association with the applying, wherein the one or more active surveillance techniques comprise at least one of, performing a model scope evaluation of the primary ML model relative to the data samples (e.g., using model scope evaluation component 106 and/or scope model $112_1$) or using a domain adapted version of the ML model (e.g., DA-ML model $116_1$) to generate the inferences (e.g., via model application component 108).

Figure 12:
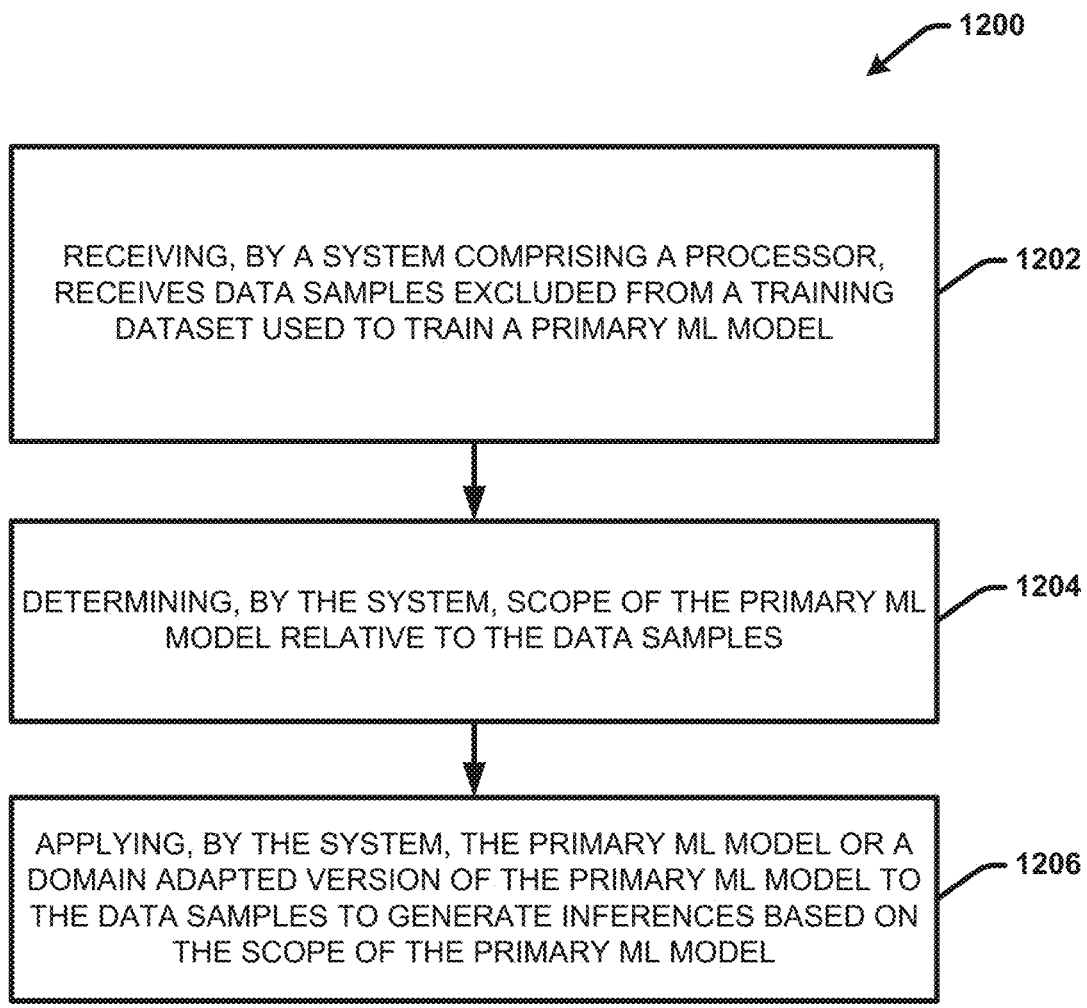
FIG. 12 illustrates a flow diagram of another example, non-limiting process for performing active surveillance for ML model deployment workflows in accordance with one or more embodiments of the disclosed subject matter.

FIG. 12 illustrates a flow diagram of an example, non-limiting process 1200 for performing active surveillance for ML model deployment workflows in accordance with one or more embodiments of the disclosed subject matter. Repetitive description of like elements employed in respective embodiments is omitted for sake of brevity.

At 1202, a system comprising a processor (e.g., system 100, system 400 and/or system 600), can receive data samples (e.g., new data samples 102) excluded from a training dataset used to train a primary ML model (e.g., ML model $114_1$). At 1204, the system can determine a scope of the primary ML model relative to the data samples (e.g., using model scope evaluation component 106 and/or scope model $112_1$). At 1206, the system can apply (e.g., using model application component 108) the primary ML model or a domain adapted version of the primary ML model (e.g., DA-ML model $116_1$) to the data samples to generate inferences based on the scope of the primary ML model.

Figure 13:
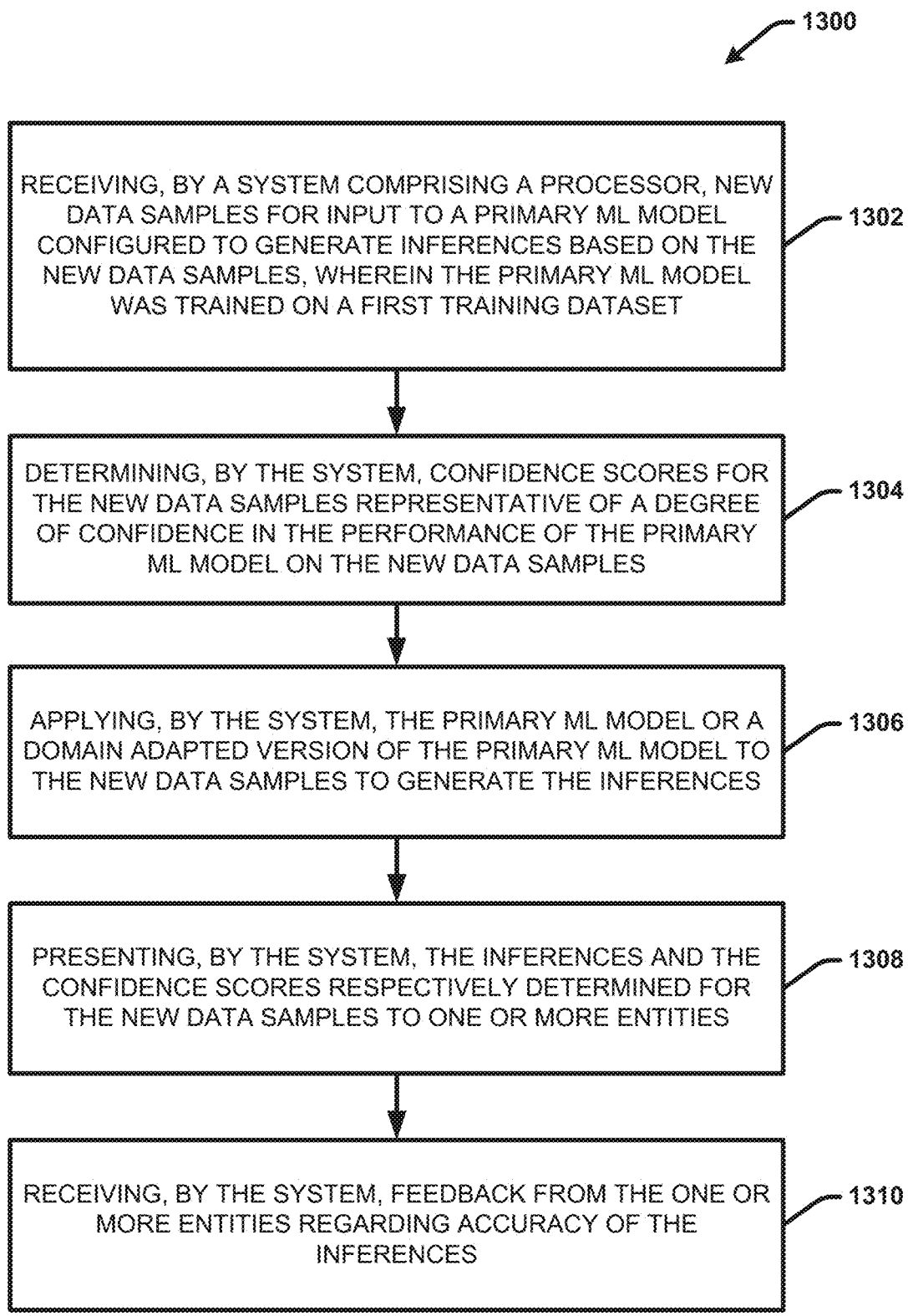
FIG. 13 illustrates a flow diagram of another example, non-limiting process for performing active surveillance for ML model deployment workflows in accordance with one or more embodiments of the disclosed subject matter.

FIG. 13 illustrates a flow diagram of another example, non-limiting process 1100 for performing active surveillance for ML model deployment workflows in accordance with one or more embodiments of the disclosed subject matter. Repetitive description of like elements employed in respective embodiments is omitted for sake of brevity.

At 1302, a system comprising a processor (e.g., system 100, system 400 and/or system 600), can receive new data samples (e.g., new data samples 102) for input to a primary ML model (e.g., primary ML model $114_1$) configured to generate inferences based on the new data samples, wherein the primary ML model was trained on a first training dataset. At 1304, the system can determine confidence scores for the new data samples representative of a degree of confidence in the performance of the primary ML model on the new data samples (e.g., using model scope evaluation component 106 and/or scope model 112₁). At 1306, the system can apply the primary ML model or a domain adapted version of the primary ML model (e.g., DA-ML model 116₁) to the new data samples to generate the inferences. At 1308, the system can present the inferences and the confidence scores respectively determined for the new data samples to one or more entities (e.g., using site dashboard component 109). At 1310, the system can receive feedback from the one or more entities regarding accuracy of the inferences (e.g., using performance evaluation component 110).

In some embodiments, the system can further generate (e.g., using reporting component 111) evaluation reports (e.g., evaluation reports 118) for the models comprising performance metrics determined for the models (e.g., using performance evaluation component 110) and/or information that can be used by the active surveillance and learning module 124 to generate the performance metrics (e.g., the scope model results, the inference results of the primary ML model 114 and/or the DA-ML model 116), the data samples, user provided feedback/annotations, etc.). The system can further send/provide the evaluation reports to the active surveillance and learning module 124 for usage in monitoring the performance of the models over time (e.g., via monitoring component 128). In various embodiments, the system can further store (e.g., in local archive database 120 and/or global archive database 122) the processed data samples 102' along with information including but not limited to: the inference results generated based on the respective data samples, information identifying the particular version of the ML model used to generate the inference results, confidence score information, usage/performance metrics, and user feedback associated with the data samples and the inference results. In some implementations, the user feedback can include annotated data for at least some of the data sample/inference result pairs regarding the performance accuracy of the inference result for the corresponding data sample. The stored information can further made accessible to the active surveillance and learning module 124 and used for continued model updating in accordance with the disclosed active learning techniques.

Figure 14:
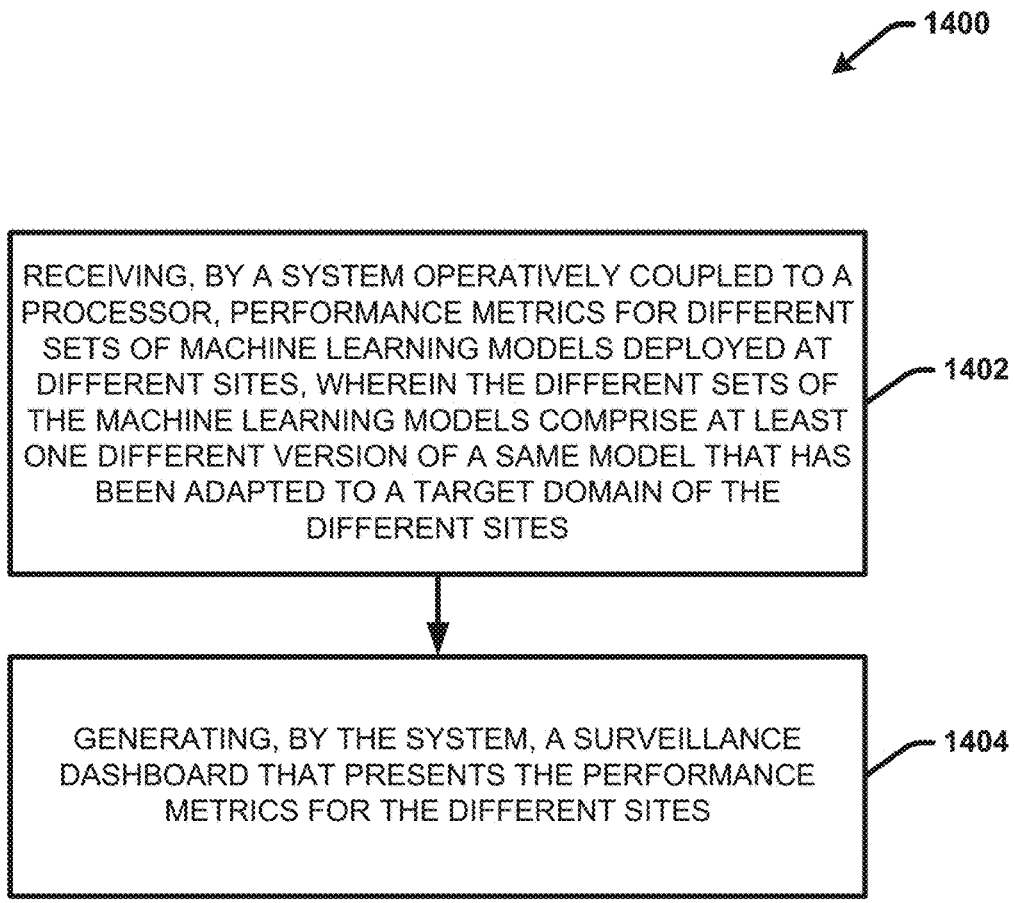
FIG. 14 illustrates a flow diagram of an example, non-limiting process for monitoring the performance of different sets of ML models deployed at different sites in accordance with one or more embodiments of the disclosed subject matter.

FIG. 14 illustrates a flow diagram of an example, non-limiting process 1400 for monitoring the performance of different sets of ML models deployed at different sites in accordance with one or more embodiments of the disclosed subject matter. Repetitive description of like elements employed in respective embodiments is omitted for sake of brevity.

At 1402, a system operatively coupled to a processor (e.g., system 100) can receive (e.g., using the active surveillance and learning module 124) performance metrics for different sets of ML models deployed at different sites (e.g., Sites 1-K), wherein the different sets of the ML models comprise at least one different version of a same model that has been adapted to a target domain of the different sites (e.g., the DA-ML model 116₁₋ₖ). At 1404, the system generates a surveillance dashboard (e.g., vendor dashboard 500) that presents the performance metrics for the different sites (e.g., using vendor dashboard component 126).

In one or more embodiments, the system can receive the performance metrics as they are generated at the different sites over a period of usage of the different sets of the ML models and the system can update the surveillance dashboard over the period of usage. For example, the system can receive the performance metrics as reported by the respective site over the period of usage. The reporting schedule/timing frequency can vary. For example, in some implementations, the sites can report the performance metrics according to a defined schedule (e.g., once a day, once a week, once a month, etc.). In another implementation, the sites can report the performance metrics in real-time (e.g., in response to determination/generation by the performance evaluation component 110.

In some embodiments, process 1400 can further include monitoring, by the system (e.g., using monitoring component 128) performance of respective models included in the different sets based on the performance metrics, and based on the monitoring, determining whether the performance of the respective models drops below a defined performance level. With these embodiments, process 1400 can also include initiating, by the system, a model updating process (e.g., active learning workflow 900, active learning workflow 1000 and the like) for a model of the respective models based on a determination that the performance of the model drops below the defined performance level.

Figure 15:
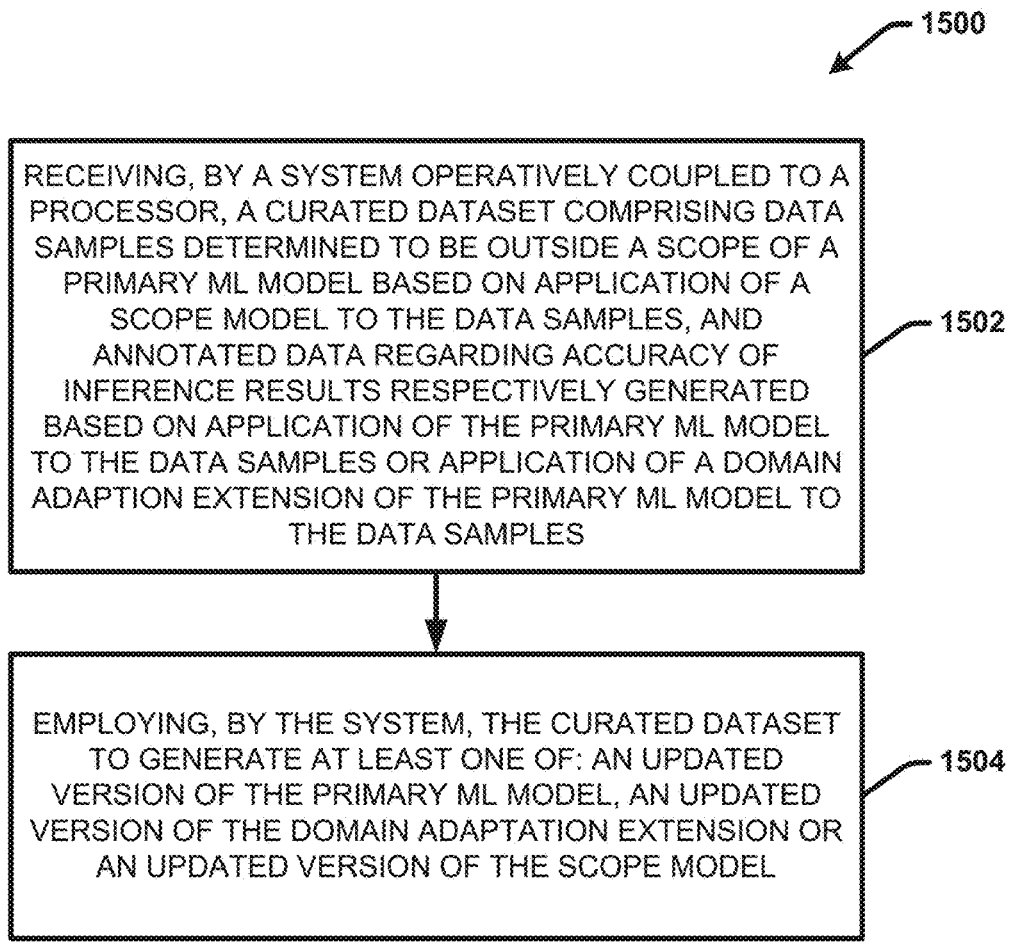
FIG. 15 illustrates a flow diagram of an example, non-limiting process for performing active learning for ML model deployment workflows in accordance with one or more embodiments of the disclosed subject matter.

FIG. 15 illustrates a flow diagram of an example, non-limiting process 1500 for performing active learning for ML model deployment workflows in accordance with one or more embodiments of the disclosed subject matter. Repetitive description of like elements employed in respective embodiments is omitted for sake of brevity.

At 1502, a system operatively coupled to a processor (e.g., system 100) can receive (e.g., via the active surveillance and learning module 124) a curated dataset (e.g., curated dataset 906) comprising data samples determined to be outside a scope of a primary ML model (e.g., primary ML model 114₁) based on application of a scope model (e.g., scope model 112₁) to the data samples, and annotated data regarding accuracy of inference results respectively generated based on application of the primary ML model to the data samples or application of a domain adaption extension of the primary ML model (e.g., DA-ML model 116₁) to the data samples. At 1504, the system can employ the curated dataset to generate at least one of: an updated version of the primary ML model (e.g., ML model 114₂), an updated version of the domain adaptation extension (e.g., DA-ML 116₂), or an updated version of the scope model (e.g., scope model 112₂).

Figure 16:
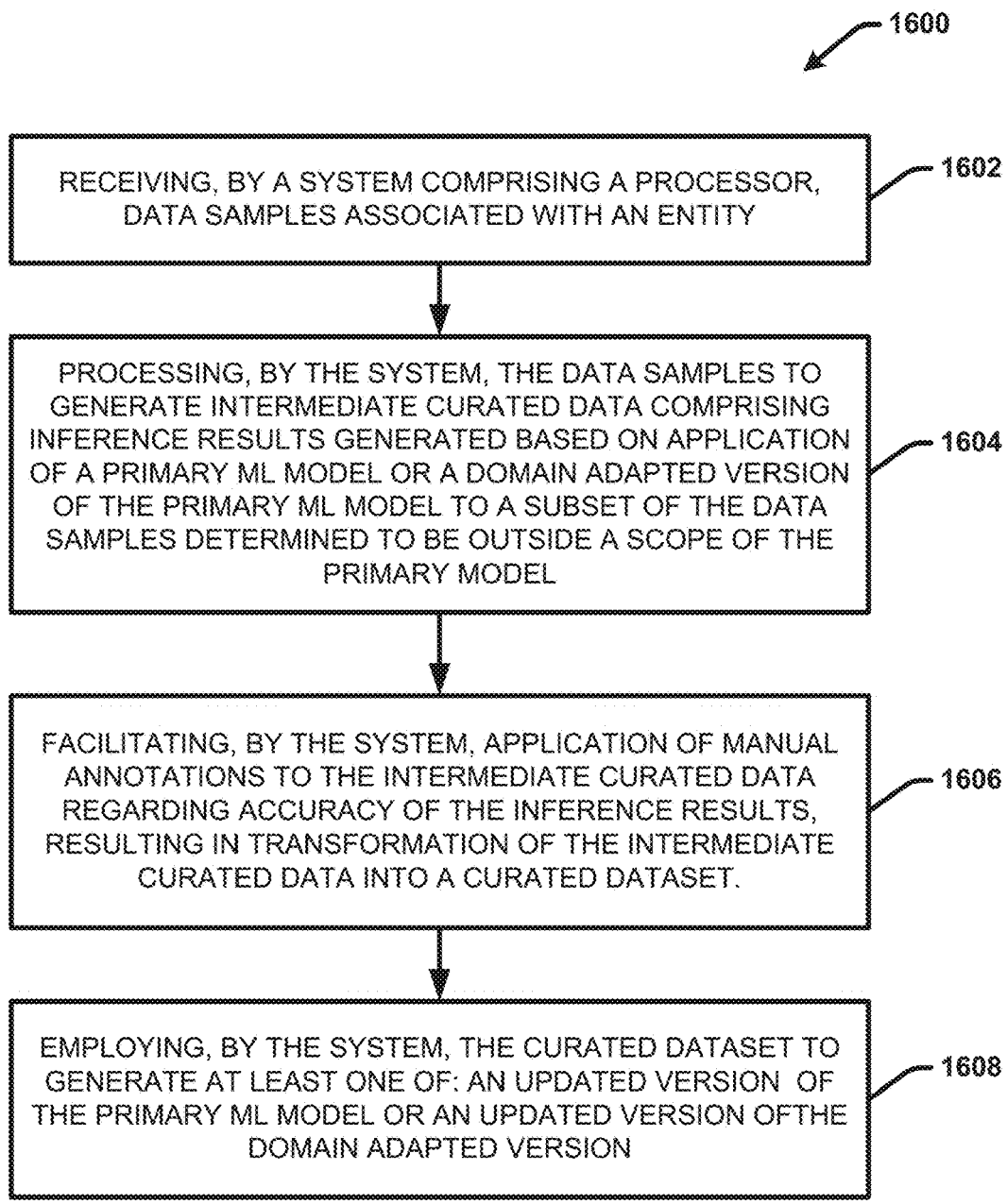
FIG. 16 illustrates a flow diagram of another example, non-limiting process for performing active learning for ML model deployment workflows in accordance with one or more embodiments of the disclosed subject matter.

FIG. 16 illustrates a flow diagram of an example, non-limiting process 1600 for performing active learning for ML model deployment workflows in accordance with one or more embodiments of the disclosed subject matter. Repetitive description of like elements employed in respective embodiments is omitted for sake of brevity.

At 1602, a system comprising a processor (e.g., system 100) can receive new data samples associated with an entity (e.g., new and/or processed data samples 102' for a particular client site). At 1604, the system can process the data samples to generate intermediate curated data (e.g., intermediate curated data 1014) comprising inference results generated based on application of a primary ML model (e.g., a primary ML model 114) or a domain adapted version of the primary ML model (e.g., a DA-ML model 116) to a subset of the data samples determined to be outside a scope of the ML model. At 1606, the system can facilitate application of manual annotations to the intermediate curated data regarding accuracy of the inference results, resulting in transformation of the intermediate curated data into a curated dataset (e.g., curated dataset 906). At 1608, the system can employ the curated dataset to generate at least one of: an updated version of the ML model (e.g., ML model 114₂) or an updated version of the domain adaptation extension (e.g., DA-ML 116₂).

It should be noted that, for simplicity of explanation, in some circumstances the computer-implemented methodologies are depicted and described herein as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 17:
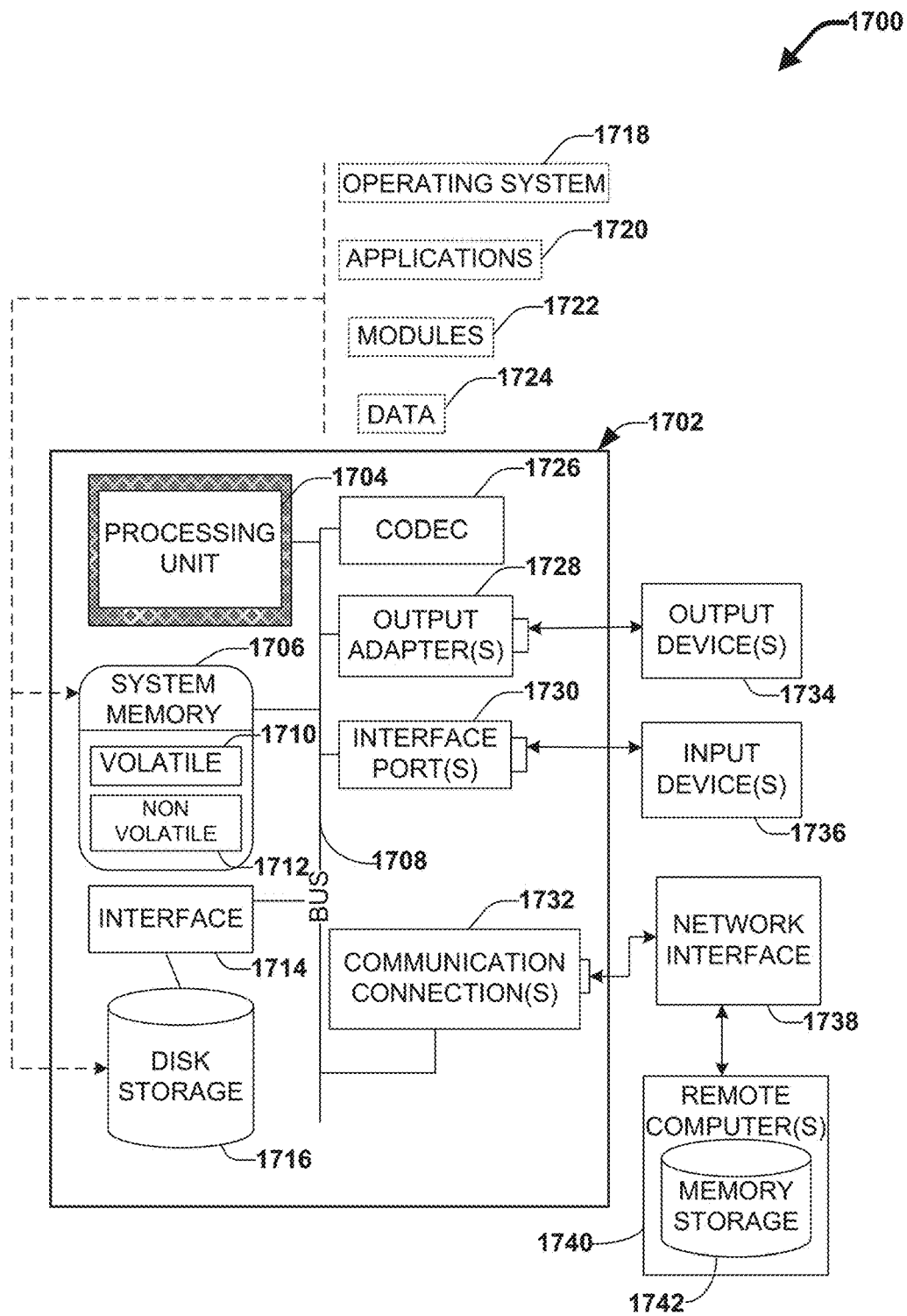
FIG. 17 illustrates a block diagram of an example, non-limiting operating environment in which one or more embodiments described herein can be facilitated.

FIG. 17 can provide a non-limiting context for the various aspects of the disclosed subject matter, intended to provide a general description of a suitable environment in which the various aspects of the disclosed subject matter can be implemented. FIG. 17 illustrates a block diagram of an example, non-limiting operating environment in which one or more embodiments described herein can be facilitated. Repetitive description of like elements employed in other embodiments described herein is omitted for sake of brevity.

With reference to FIG. 17, a suitable operating environment 1700 for implementing various aspects of this disclosure can also include a computer 1702. The computer 1702 can also include a processing unit 1704, a system memory 1706, and a system bus 1708. The system bus 1708 couples system components including, but not limited to, the system memory 1706 to the processing unit 1704. The processing unit 1704 can be any of various available processors. Dual microprocessors and other multiprocessor architectures also can be employed as the processing unit 1704. The system bus 1708 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 17124), and Small Computer Systems Interface (SCSI).

The system memory 1706 can also include volatile memory 1710 and nonvolatile memory 1712. The basic input/output system (BIOS), containing the basic routines to transfer information between elements within the computer 1702, such as during start-up, is stored in nonvolatile memory 1712. Computer 1702 can also include removable/non-removable, volatile/non-volatile computer storage media. FIG. 17 illustrates, for example, a disk storage 1714. Disk storage 1714 can also include, but is not limited to, devices like a magnetic disk drive, floppy disk drive, tape drive, Jaz drive, Zip drive, LS-100 drive, flash memory card, or memory stick. The disk storage 1714 also can include storage media separately or in combination with other storage media. To facilitate connection of the disk storage 1714 to the system bus 1708, a removable or non-removable interface is typically used, such as interface 1716. FIG. 17 also depicts software that acts as an intermediary between users and the basic computer resources described in the suitable operating environment 1700. Such software can also include, for example, an operating system 1718. Operating system 1718, which can be stored on disk storage 1714, acts to control and allocate resources of the computer 1702.

System applications 1720 take advantage of the management of resources by operating system 1718 through program modules 1722 and program data 1724, e.g., stored either in system memory 1706 or on disk storage 1714. It is to be appreciated that this disclosure can be implemented with various operating systems or combinations of operating systems. A user enters commands or information into the computer 1702 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1704 through the system bus 1708 via interface port(s) 1730. Interface port(s) 1730 include, for example, a serial port, a parallel port, a game port, and a universal serial bus (USB). Output device(s) 1734 use some of the same type of ports as input device(s) 1736. Thus, for example, a USB port can be used to provide input to computer 1702, and to output information from computer 1702 to an output device 1734. Output adapter 1728 is provided to illustrate that there are some output devices 1734 like monitors, speakers, and printers, among other output devices 1734, which require special adapters. The output adapters 1728 include, by way of illustration and not limitation, video and sound cards that provide a means of connection between the output device 1734 and the system bus 1708. It should be noted that other devices and/or systems of devices provide both input and output capabilities such as remote computer(s) 1740.

Computer 1702 can operate in a networked environment using logical connections to one or more remote computers, such as remote computer(s) 174. The remote computer(s) 1740 can be a computer, a server, a router, a network PC, a workstation, a microprocessor based appliance, a peer device or other common network node and the like, and typically can also include many or all of the elements described relative to computer 1702. For purposes of brevity, only a memory storage device 1742 is illustrated with remote computer(s) 1740. Remote computer(s) 1740 is logically connected to computer 1702 through a network interface 1738 and then physically connected via communication connection 1732. Network interface 1738 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1732 refers to the hardware/software employed to connect the network interface 1738 to the system bus 1708. While communication connection 1732 is shown for illustrative clarity inside computer 1702, it can also be external to computer 1702. The hardware/software for connection to the network interface 1738 can also include, for exemplary purposes only, internal and external technologies such as, modems including regular telephone grade modems, cable modems and DSL modems, ISDN adapters, and Ethernet cards.

One or more embodiments described herein can be a system, a method, an apparatus and/or a computer program product at any possible technical detail level of integration. The computer program product can include a computer readable storage medium (or media) having computer readable program instructions thereon for causing a processor to carry out aspects of one or more embodiment. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In this regard, in various embodiments, a computer readable storage medium as used herein can include non-transitory and tangible computer readable storage mediums.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments.

Aspects of one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on one or more computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that can provide specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result (e.g., including employing ML and/or ML techniques to determine the intermediate results), etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to: sensors, antennae, audio and/or visual output devices, other devices, etc.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches, and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   processing, by a system comprising a processor, data samples received in a target domain, wherein the processing comprises, iteratively:
   receiving a data sample of the data samples in the target domain;
   determining, using a scope machine learning model, a confidence score for the data sample representative of a degree of confidence that a primary machine learning (ML) model will generate an accurate inference based on the data sample, wherein the primary ML model was trained on a training dataset associated with a source domain different from the target domain, and wherein the training dataset does not comprise the data samples received in the target domain;
   in response to determining that the confidence score meets a threshold score, employing the primary ML model to generate an inference based on the data sample; and
   in response to determining that the confidence score does not meet the threshold score:
   adding the data sample to a new training dataset associated with the target domain, and
   in response to the new training dataset satisfying a defined criterion, training the primary ML model on the new training dataset to generate the inferences, resulting in a domain adapted version of the primary ML model.

2. The method of claim 1, wherein, the in response to determining that the confidence score does not meet the threshold score, further comprises:
   determining whether the domain adapted version of the primary ML model exists;
   in response to determining that the domain adapted version of the primary ML model exists, employing domain adapted version of the primary ML model to generate the inference based on the data sample; and
   in response to determining that the domain adapted version of the primary ML model does not exist, employing the primary ML model to generate the inference based on the data sample.

3. The method of claim 1, wherein, the in response to determining that the confidence score does not meet the threshold score, further comprises:
   employing the primary ML model to generate the inference based on the data sample;
   determining whether the domain adapted version of the primary ML model exists; and
   in response to determining that the domain adapted version of the primary ML model exists, employing the domain adapted version of the primary ML model on the inference to generate a corrected inference based on the data sample.

4. The method of claim 1, further comprising:
   presenting, by the system, the inferences and the confidence scores respectively determined for the data samples to one or more entities; and
   receiving, by the system, feedback from one or more entities regarding accuracy of the inferences.

5. The method of claim 4, further comprising:
   generating, by the system, performance evaluation information for the primary ML model and the domain adapted version of the primary ML model, the performance evaluation information comprising the confidence scores and the feedback; and
   sending, by the system, the performance evaluation information to an external system that monitors performance of a plurality of ML models deployed at different sites.

6. The method of claim 5, further comprising:
   storing, by the system in a database accessible to the external system, the data samples, the inferences respectively determined for the data samples, and the performance evaluation information respectively associated with the data samples.

7. The method of claim 1, wherein the determining the confidence score comprises employing an outlier detection model of the scope machine learning model to determine whether the data sample is within a scope of the training dataset associated with the source domain.

8. The method of claim 7, wherein the outlier detection model was developed based on projection of the training dataset onto a standard feature space.

9. The method of claim 7, wherein the outlier detection model was trained on the training dataset and wherein the method further comprises:
receiving, by the system, an updated version of the outlier detection model trained on a second training dataset comprising a subset of the data samples determined to be outside a scope of the primary ML model; and
based on the receiving, employing, by the system, the updated outlier detection model instead of the outlier detection model for determining the confidence score.

10. The method of claim 1, wherein the primary ML model comprises a feature extraction network and a deep neural network trained based on the training dataset associated with the source domain.

11. The method of claim 10, wherein the domain adapted version of the primary ML model comprises a second feature extraction network trained based on the new training dataset associated with the target domain, and the deep neural network trained based on the training dataset associated with the source domain.

12. The method of claim 3, wherein the domain adapted version of the primary ML model comprises a shape autoencoder that corrects inferences generated by the primary ML model.

13. The method of claim 1, wherein the primary ML model is trained to perform image classification of images captured via a first modality, and the domain adapted version of the primary ML model is trained to perform image classification of images captured via a second modality different from the first modality.

14. The method of claim 1, wherein the primary ML model comprises a deep neural network model configured to generate the inferences using a task selected from a group consisting of: a classification task, a segmentation task, a detection task and a regression task.

15. A system, comprising:
a memory that stores computer executable components; and
a processor that executes the computer executable components stored in the memory, wherein the computer executable components comprise:
a model deployment module that processes data samples received in a target domain, wherein the processing comprises, iteratively:
receiving a data sample of the data samples in the target domain;
determining, using a scope machine learning model, a confidence score for the data sample representative of a degree of confidence that a primary machine learning (ML) model will generate an accurate inference based on the data sample, wherein the primary ML model was trained on a training dataset associated with a source domain different from the target domain, and wherein the training dataset does not comprise the data samples received in the target domain;
in response to determining that the confidence score meets a threshold score, employing the primary ML model to generate an inference based on relative to the data sample; and
in response to determining that the confidence score does not meet the threshold score:
adding the data sample to a new training dataset associated with the target domain, and
in response to the new training dataset satisfying a defined criterion, training on the new training dataset to generate the inferences, resulting in the primary ML model on the new training dataset to generate the inferences, resulting in a domain adapted version of the primary ML model.

16. The system of claim 15, wherein, the in response to determining that the confidence score does not meet the threshold score, further comprises:
determining whether the domain adapted version of the primary ML model exists;
in response to determining that the domain adapted version of the primary ML model exists, employing domain adapted version of the primary ML model to generate the inference based on the data sample; and
in response to determining that the domain adapted version of the primary ML model does not exist, employing the primary ML model to generate the inference based on the data sample.

17. The system of claim 15, wherein, the in response to determining that the confidence score does not meet the threshold score, further comprises:
employing the primary ML model to generate the inference based on the data sample;
determining whether the domain adapted version of the primary ML model exists; and
in response to determining that the domain adapted version of the primary ML model exists, employing the domain adapted version of the primary ML model on the inference to generate a corrected inference based on the data sample.

18. The system of claim 15, wherein the computer executable components further comprise:
a dashboard component that presents the inferences and the confidence scores respectively determined for the data samples to one or more entities via an interactive dashboard that provides a mechanism for receiving feedback from the one or more entities regarding accuracy of the inferences.

19. The system of claim 18, wherein the computer executable components further comprise:
a performance evaluation component that generates performance evaluation information for the primary ML model and the domain adapted version of the primary ML model, the performance evaluation information comprising the confidence scores and the feedback; and
a reporting component that sends the performance evaluation information to an external system that monitors performance of a plurality of ML models deployed at different sites.

20. The system of claim 15, wherein the primary ML model comprises a feature extraction network and a deep neural network trained based on the training dataset associated with the source domain.

21. The system of claim 20, wherein the domain adapted version of the primary ML model comprises a second feature extraction network trained based on the new training dataset associated with the target domain, and the deep neural network trained based on the training dataset associated with the source domain.

22. A non-transitory machine-readable medium, comprising executable instructions that, when executed by a processor, facilitate performance of operations, comprising:
processing data samples received in a target domain, wherein the processing comprises, iteratively:
receiving a data sample of the data samples in the target domain;
determining, using a scope machine learning model, a confidence score for the data sample representative of a degree of confidence that a primary machine learning (ML) model will generate an accurate inference based on the data sample, wherein the primary ML model was trained on a training dataset associated with a source domain different from the target domain, and wherein the training dataset does not comprise the data samples received in the target domain;
in response to determining that the confidence score meets a threshold score, employing the primary ML model to generate an inference based on the data sample; and
in response to determining that the confidence score does not meet the threshold score:
adding the data sample to a new training dataset associated with the target domain, and
in response to the new training dataset satisfying a defined criterion, training the primary ML model on the new training dataset to generate the inferences, resulting in a domain adapted version of the primary ML model.

23. The non-transitory machine-readable medium of claim 22, wherein, the in response to determining that the confidence score does not meet the threshold score, further comprises:
determining whether the domain adapted version of the primary ML model exists;
in response to determining that the domain adapted version of the primary ML model exists, employing domain adapted version of the primary ML model to generate the inference based on the data sample; and
in response to determining that the domain adapted version of the primary ML model does not exist, employing the primary ML model to generate the inference based on the data sample.

24. A method, comprising:
receiving, by a system operatively coupled to a processor, performance metrics for at least one primary machine learning model deployed in at least one site wherein the at least one primary machine learning model are trained based on respective training datasets associated with respective source domains;
generating, by the system, a surveillance dashboard that presents the performance metrics; and
in response to a determination that the performance metrics for a primary machine learning model of the at least one primary machine learning model do not meet a performance criterion, updating, by the system, the primary machine learning model, wherein the updating comprises:
processing data samples received in a target domain associated with the primary machine learning model that is different from the source domain, wherein the processing comprises, iteratively:
receiving a data sample of the data samples in the target domain;
determining, using a scope machine learning model, a confidence score for the data sample representative of a degree of confidence that a primary machine learning (ML) model will generate an accurate inference based on the data sample, wherein the primary ML model was trained on a training dataset associated with a source domain different from the target domain, wherein the training dataset does not comprise the data samples received in the target domain;
in response to determining that the confidence score meets a threshold score, employing the primary ML model to generate an inference based on the data sample; and
in response to determining that the confidence score does not meet the threshold score:
adding the data sample to a new training dataset associated with the target domain, and
in response to the new training dataset satisfying a defined criterion, training the primary ML model on the new training dataset to generate the inferences, resulting in a domain adapted version of the primary ML model.

25. The method of claim 24, wherein, the in response to determining that the confidence score does not meet the threshold score, further comprises:
determining whether the domain adapted version of the primary ML model exists;
in response to determining that the domain adapted version of the primary ML model exists, employing domain adapted version of the primary ML model to generate the inference based on the data sample; and
in response to determining that the domain adapted version of the primary ML model does not exist, employing the primary ML model to generate the inference based on the data sample.

26. The method of claim 24, wherein, the in response to determining that the confidence score does not meet the threshold score, further comprises:
employing the primary ML model to generate the inference based on the data sample;
determining whether the domain adapted version of the primary ML model exists; and
in response to determining that the domain adapted version of the primary ML model exists, employing the domain adapted version of the primary ML model on the inference to generate a corrected inference based on the data sample.

27. The non-transitory machine-readable medium of claim 22, wherein, the in response to determining that the confidence score does not meet the threshold score, further comprises:
employing the primary ML model to generate the inference based on the data sample;
determining whether the domain adapted version of the primary ML model exists; and
in response to determining that the domain adapted version of the primary ML model exists, employing the domain adapted version of the primary ML model on the inference to generate a corrected inference based on the data sample.

\* \* \* \* \*